(12) United States Patent
Chang et al.

(10) Patent No.: US 9,008,161 B1
(45) Date of Patent: Apr. 14, 2015

(54) CALIBRATION METHOD AND CALIBRATION APPARATUS FOR CALIBRATING MISMATCH BETWEEN I-PATH AND Q-PATH OF TRANSMITTER/RECEIVER

(71) Applicant: Realtek Semiconductor Corp., HsinChu (TW)

(72) Inventors: Yuan-Shuo Chang, Taoyuan County (TW); Ching-Chia Cheng, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 14/547,142

(22) Filed: Nov. 19, 2014

(30) Foreign Application Priority Data

Dec. 4, 2013 (TW) .............................. 102144463 A

(51) Int. Cl.
*H04B 1/38* (2006.01)
*H04L 5/16* (2006.01)
*H04B 17/00* (2006.01)

(52) U.S. Cl.
CPC .................................. *H04B 17/0012* (2013.01)

(58) Field of Classification Search
CPC ... H04L 1/243; H04L 1/0009; H04L 27/2647; H04L 27/2332; H04L 25/067; H04L 1/0045; H04L 1/20; H04L 1/24; H04B 1/40

USPC .................. 375/221, 219, 224, 316, 324, 340
See application file for complete search history.

(56) References Cited

U.S. PATENT DOCUMENTS

| | | | | |
|---|---|---|---|---|
| 6,061,390 | A * | 5/2000 | Meehan et al. | 375/150 |
| 7,286,855 | B2 * | 10/2007 | Raleigh et al. | 455/562.1 |
| 2014/0341263 | A1 * | 11/2014 | Wu et al. | 375/224 |

* cited by examiner

*Primary Examiner* — Ted Wang
(74) *Attorney, Agent, or Firm* — Winston Hsu; Scott Margo

(57) ABSTRACT

A method for calibrating mismatches of an in-phase signal path and a quadrature signal path of a transmitter, including: additionally configuration at least one mixer calibration coefficient at a transmitting part of the transmitter; obtaining at least one mixer testing signal from the transmitting part via loopback for spectrum analysis to derive at least one mixer spectrum analysis result; adjusting the mixer calibration coefficient of the transmitting part according to the mixer spectrum analysis result; and additionally utilizing an in-phase signal path finite impulse response filter and a quadrature signal path finite impulse response filter to calibrate mismatches between a low pass filter of the in-phase signal path of the transmitting part of the transmitter and a low pass filter of the quadrature signal path of the transmitting part of the transmitter. A similar mismatch calibration operation may be applied to a receiver.

30 Claims, 17 Drawing Sheets

CALIBRATION METHOD AND CALIBRATION APPARATUS FOR CALIBRATING MISMATCH BETWEEN I-PATH AND Q-PATH OF TRANSMITTER/RECEIVER

BACKGROUND OF THE INVENTION

1. Field of the Invention

The disclosed embodiments of the present invention relate to a calibration method, and more particularly, to a systematic defect analysis method which is able to calibrate mismatches between an in-phase signal path and a quadrature-phase signal path of a transmitter/receiver, and an associated apparatus.

2. Description of the Prior Art

A modulation technique which is defined as 'complicated' carries more information than in general cases. The data transmission rate may be increased through sophisticated modulation processes, e.g. 64-Quadrature Amplitude Modulation (QAM) or 256-QAM. A need for high level QAM is therefore increasing. To improve the transmission and receiving ability of the high level QAM, an Error Vector Magnitude (EVM) of a communication system has to be correspondingly improved. One factor affecting the EVM is the extent of an imbalance between in-phase and quadrature-phase (IQ imbalance). The main factor which induces IQ imbalance is a mismatch between the in-phase path and the quadrature-phase path of a radio frequency (RF) circuit. Even a slight deviation may result in an imperfect quadrature modulation/demodulation process and affect the overall communication system, which leads to a high reception bit error rate (BER). The deviation is divided into two categories: amplitude deviation and phase deviation, wherein both categories can introduce an image signal at symmetric frequency. FIG. 1 is a diagram illustrating a received signal at a receiving terminal and an introduced image signal of the received signal. The difference between the magnitude of the received signal and the magnitude of the image signal is known as the image rejection ratio (IRR). In practice, the IRR is inversely proportional to the extent of the IQ imbalance.

In order to solve the above issue, a calibration process (i.e. IQ calibration) may be performed upon a transceiver before the transceiver starts to transmit and receive data. The IQ mismatch phenomenon can present itself in two ways. A first way is, when sending carriers to a mixer of an in-phase path and a quadrature-phase path from a local oscillator (LO), it is difficult to keep a perfect phase difference of 90 degrees, or to guarantee that two amplitudes of the two signals are exactly the same. The other way is imperfection of the circuit manufacturing process, which causes component mismatches between the two paths, such as mismatches between a low-pass filter (LPF) pair, an analog-to-digital converter (ADC) pair, a digital-to-analog converter (DAC) or a gain amplifier pair. The component mismatches can also explain the interfering image signal as shown in FIG. 1 and are frequency dependent resulting in the extent of interference by image signals at different frequencies varying.

In summary, how to perform IQ calibration in a communication system has become an urgent issue in the field.

SUMMARY OF THE INVENTION

According to the disclosed embodiments of the present invention, systematic defect analysis methods which are able to calibrate mismatches between an in-phase signal path and a quadrature signal path of a transmitter or a receiver are disclosed to improve the aforementioned issues. An associated apparatus is also disclosed.

According to an exemplary embodiment of the present invention, a method for calibrating mismatches between a first signal path and a second signal path of a transmitter is disclosed, wherein one of the first signal path and the second signal path is an in-phase signal path; and the other is a quadrature signal path. The calibration method comprises: additionally configuring at least one mixer calibration coefficient at a transmission terminal of the transmitter; producing a first transmission signal according to at least one mixer test signal and the mixer calibration coefficient, and looping back the first transmission signal for spectrum analysis to derive at least one mixer spectrum analysis result; adjusting the mixer calibration coefficient according to the mixer spectrum analysis result to derive a final value of the mixer calibration coefficient for calibrating a mismatch between a first mixer of the first signal path and a second mixer of the second signal path; and performing a first signal path finite impulse response (FIR) filtering process upon the first signal path by additionally utilizing a first signal path FIR filter, and performing a second signal path FIR filtering process upon the second signal path by additionally utilizing a second signal path FIR filter, to calibrate a mismatch between a first filter of the first signal path and a second filter of the second signal path.

According to another exemplary embodiment of the present invention, a method for calibrating mismatches between a first signal path and a second signal path of a receiver is disclosed, wherein one of the first signal path and the second signal path is an in-phase signal path; and the other is a quadrature signal path. The calibration method comprises: additionally configuring at least one mixer calibration coefficient at a receiving terminal of the receiver; outputting the mixer test signal at a transmission terminal of the receiver as a first transmission signal, and looping back the first transmission signal and performing spectrum analysis upon the received first transmission signal after it passes through the mixer calibration coefficient, for deriving at least one mixer spectrum analysis result; adjusting the mixer calibration coefficient of the receiver according to the mixer spectrum analysis result to derive a final value of the mixer calibration coefficient for calibrating a mismatch between a first mixer of the first signal path and a second mixer of the second signal path; and performing a first signal path finite impulse response (FIR) filtering process upon the first signal path by additionally utilizing a first signal path FIR filter, and performing a second signal path FIR filtering process upon the second signal path by additionally utilizing a second signal path FIR filter, to calibrate a mismatch between a first filter of the first signal path and a second filter of the second signal path.

According to yet another exemplary embodiment of the present invention, an apparatus for calibrating mismatches between a first signal path and a second signal path of a transmitter is disclosed, wherein one of the first signal path and the second signal path is an in-phase signal path; and the other is a quadrature signal path. The calibration apparatus comprises a mixer calibration coefficient unit, a mixer test signal generating unit, a spectrum analysis unit, a mixer calibration coefficient adjustment unit and a finite impulse response (FIR) filtering unit. The mixer calibration coefficient unit is coupled to a transmission terminal of the transmitter, wherein the mixer calibration coefficient unit is configured to have at least one mixer calibration coefficient. The mixer test signal generating unit is arranged for producing a first transmission signal by controlling at least one mixer test signal to start from the transmission terminal and to pass through the mixer calibration coefficient. The spectrum analysis unit is arranged for performing spectrum analysis upon the received first transmission signal to derive at least one mixer spectrum analysis result. The mixer calibration coefficient adjustment unit is arranged for adjusting the mixer calibration coefficient according to the mixer spectrum analysis result to derive a final value of the mixer calibration coefficient for calibrating a mismatch between a first mixer of the first signal path and a second mixer of the second signal path. The finite impulse response (FIR) filtering unit is coupled to the transmission terminal of the transmitter, and arranged for performing a first signal path FIR filtering process upon the first signal path by additionally utilizing a first signal path FIR filter, and performing a second signal path FIR filtering process upon the second signal path by additionally utilizing a second signal path FIR filter, to calibrate a mismatch between a first filter of the first signal path and a second filter of the second signal path.

According to yet another exemplary embodiment of the present invention, an apparatus for calibrating mismatches between a first signal path and a second signal path of a receiver is disclosed, wherein one of the first signal path and the second signal path is an in-phase signal path; and the other is a quadrature signal path. The calibration apparatus comprises: a mixer calibration coefficient unit, a mixer test signal generating unit, a spectrum analysis unit, a mixer calibration coefficient adjustment unit and a finite impulse response (FIR) filtering unit. The mixer calibration coefficient unit is coupled to a receiving terminal of the receiver, wherein the mixer calibration coefficient unit is configured to have at least one mixer calibration coefficient. The mixer test signal generating unit is arranged for outputting the mixer test signal at a transmission terminal of the receiver as a first transmission signal. The spectrum analysis unit is arranged for performing spectrum analysis upon the received first transmission signal which passes through the mixer calibration coefficient, to derive at least one mixer spectrum analysis result. The mixer calibration coefficient adjustment unit is arranged for adjusting the mixer calibration coefficient according to the mixer spectrum analysis result to derive a final value of the mixer calibration coefficient for calibrating a mismatch between a first mixer of the first signal path and a second mixer of the second signal path. The finite impulse response (FIR) filtering unit is coupled to the receiving terminal of the receiver, and arranged for performing a first signal path FIR filtering process upon the first signal path by additionally utilizing a first signal path FIR filter, and performing a second signal path FIR filtering process upon the second signal path by additionally utilizing a second signal path FIR filter, to calibrate a mismatch between a first filter of the first signal path and a second filter of the second signal path.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is coupled to another device, that connection may be through a direct electrical connection, or through an indirect electrical connection via other devices and connections.

Figure 1:
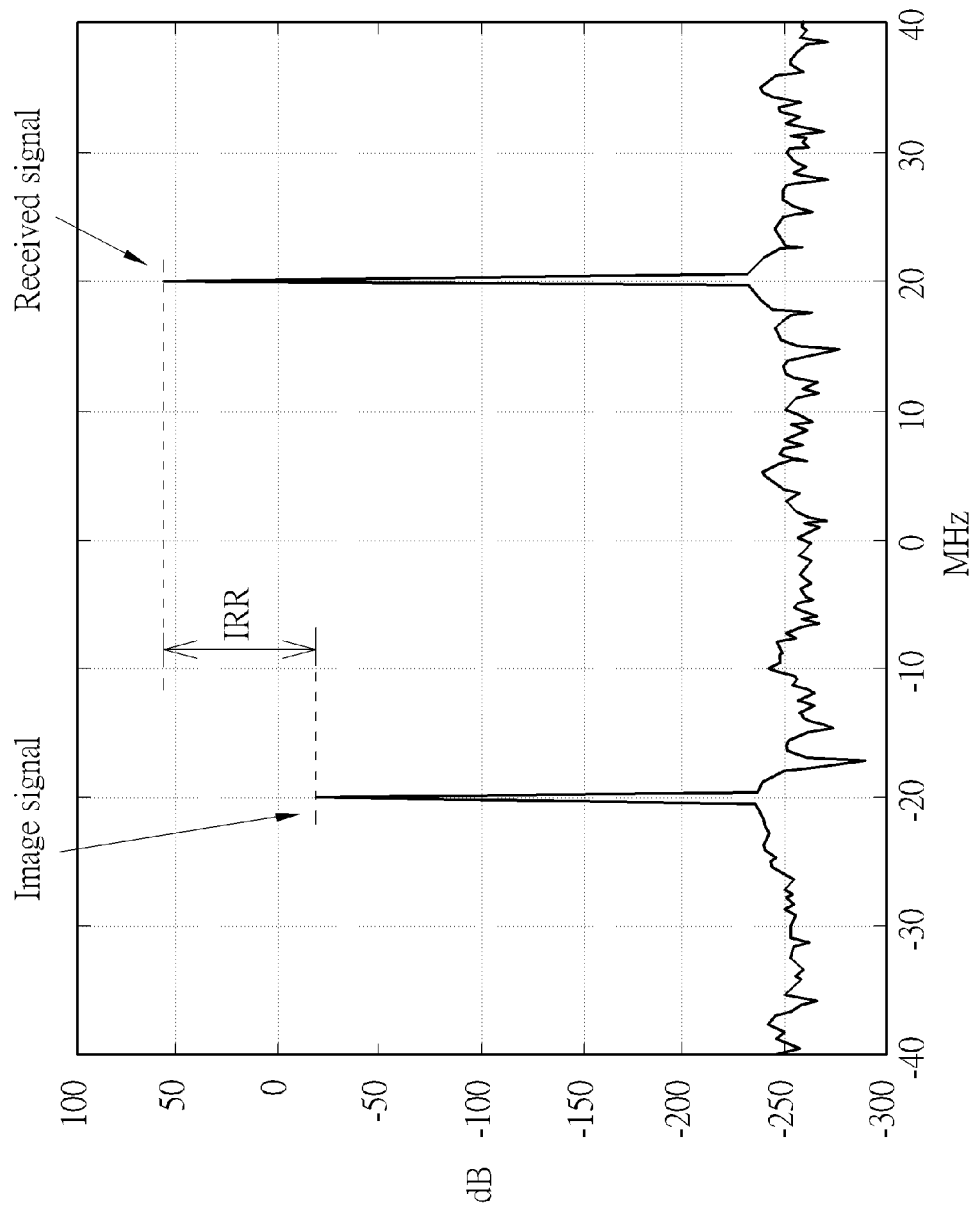
FIG. 1 is a diagram illustrating a received signal at a receiving terminal and an introduced image signal of the received signal.
Figure 2:
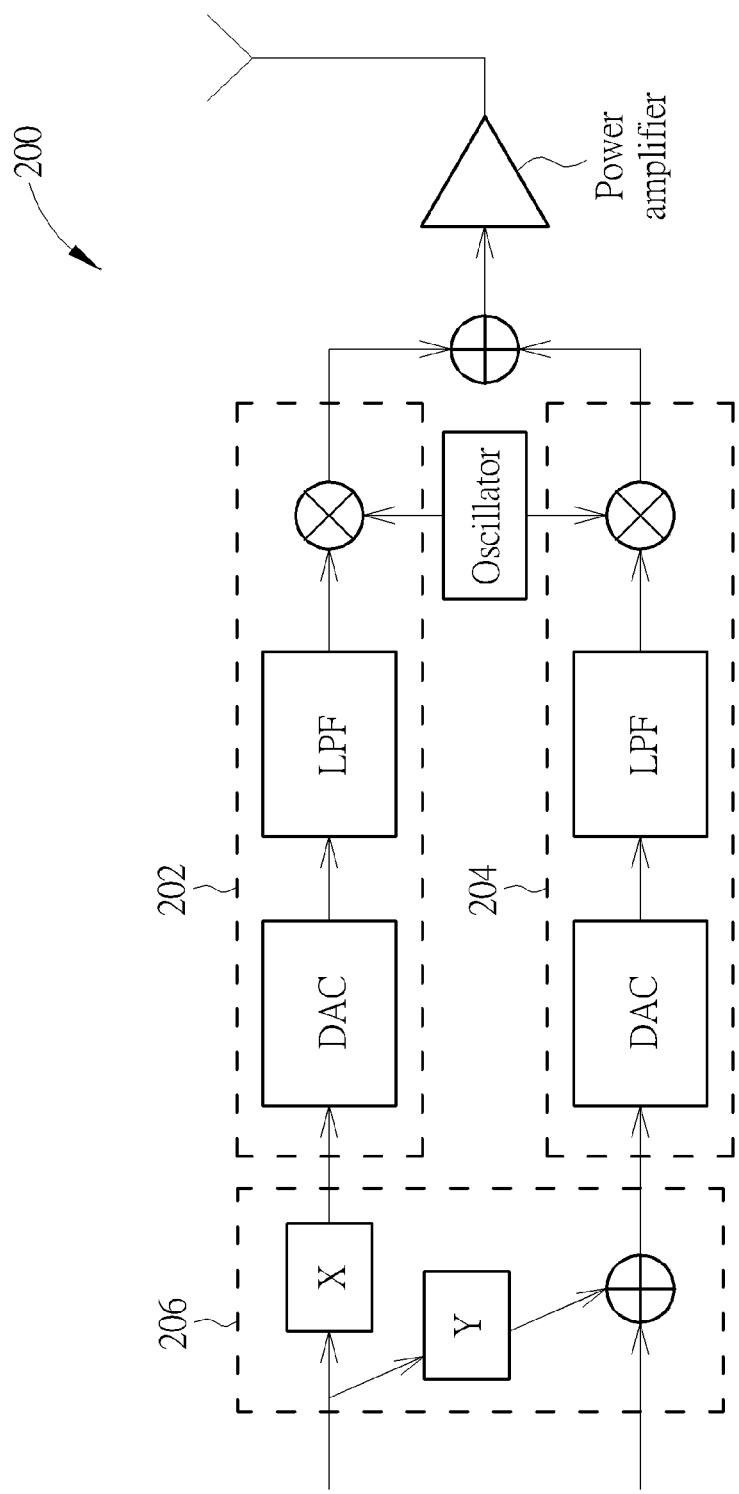
FIG. 2 is a diagram illustrating a transmitter of a transmitter of a direct-conversion transceiver.

Regarding the concept of a disclosed calibration apparatus of the present invention, a mathematic aspect is initially discussed. FIG. 2 is a diagram illustrating a transmitter 200 of a direct-conversion transceiver. To test whether mismatches exist between an in-phase signal path (I-path) 202 and a quadrature signal path (Q-path) 204, a single-tone signal (i.e. a signal which only consists of a single frequency component) may be utilized as a test signal to pass through the signal paths of the transmitter 200; and then the signal outputted from the transmitter 200 is inspected to identify if there is an image signal. A strong image signal indicates that the I-path 202 and the Q-path 204 are highly mismatched. The transmitter 200 includes a calibration coefficient unit 206 which has two calibration coefficients: a first coefficient X and a second coefficient Y. As shown in FIG. 2, the first coefficient X is utilized to calibrate amplitude mismatches between the I-path 202 and the Q-path 204; and the second coefficient Y is utilized to calibrate phase mismatches between the I-path 202 and the Q-path 204. The image signal can be completely canceled or mitigated by optimizing the first coefficient X and the second coefficient Y of the calibration coefficient unit 206. Theoretically, to completely compensate the effect of the image signal, the following equations' conditions have to be met.

$$X = \frac{1}{R\cos(\Phi)} \quad (1)$$

$$Y = -\tan(\Phi) \quad (2)$$

where $\Phi$ denotes a phase difference produced by a single-tone test signal with frequency $f_s$ which passes through the I-path 202 and the Q-path 204, respectively; R denotes an amplitude ratio produced by the single-tone test signal with frequency $f_s$ which passes through the I-path 202 and the Q-path 204, respectively.

Figure 3:
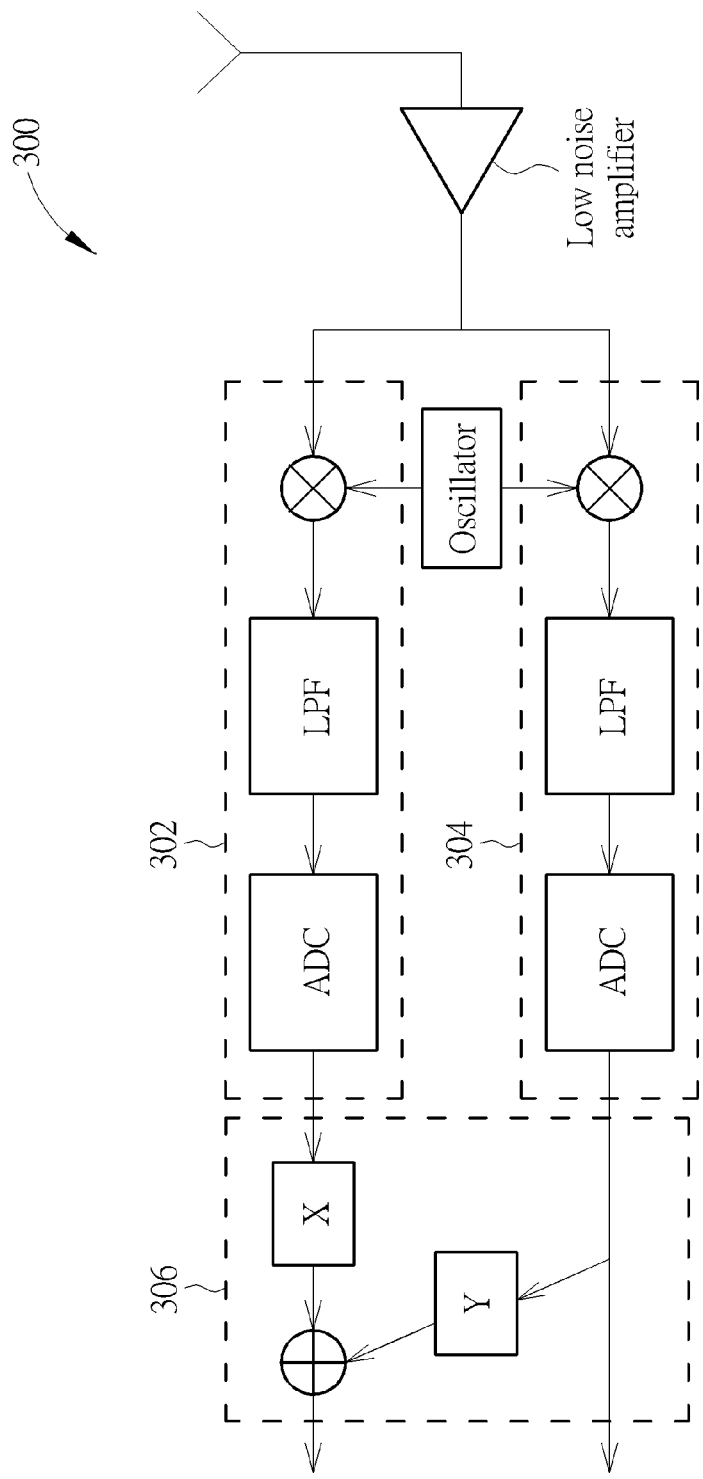
FIG. 3 is a diagram illustrating a receiver of a direct-conversion transceiver.

FIG. 3 is a diagram illustrating a receiver 300 of a direct-conversion transceiver. To test whether mismatches exist between an in-phase signal path (I-path) 302 and a quadrature signal path (Q-path) 304, a single-tone signal (i.e. a signal only consisting of a single frequency component) may be utilized as a test signal to pass through the signal paths of the receiver 300; and then the signal outputted from the receiver 300 is inspected to identify if there is an image signal. The receiver 300 includes a calibration coefficient unit 306 which has two calibration coefficients: a first coefficient X and a second coefficient Y. As above, when conditions of equation (1) and equation (2) are both met, the image signal can be completely canceled. $\Phi$ denotes a phase difference produced by a single-tone test signal with frequency $f_s$ which passes through the I-path 302 and the Q-path 304, respectively; R denotes an amplitude ratio produced by the single-tone test signal with frequency $f_s$ which passes through the I-path 302 and the Q-path 304, respectively.

Figure 4:
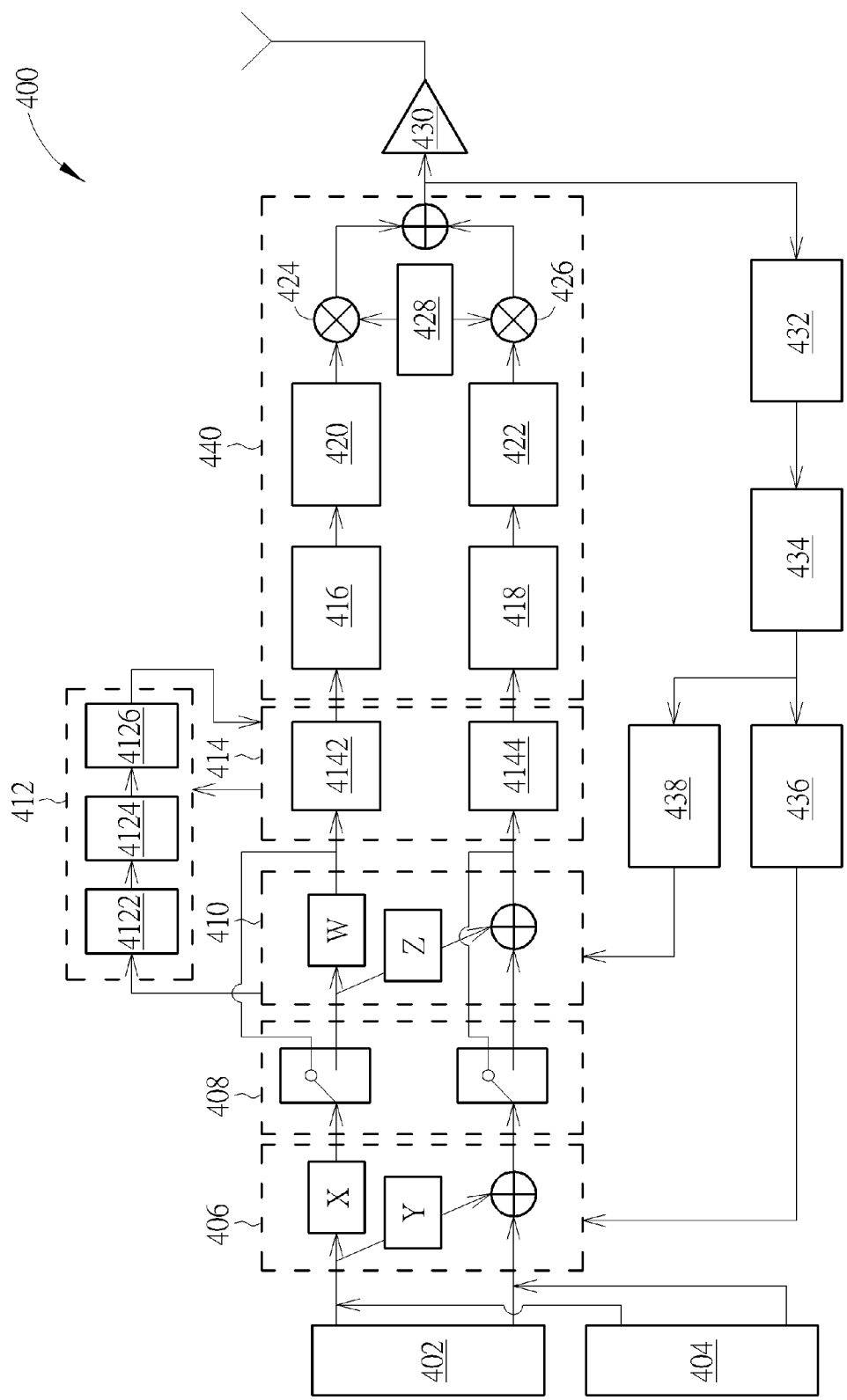
FIG. 4 is a diagram illustrating a calibration apparatus applied for calibrating mismatches between a first signal path and a second signal path of a transmitter according to an embodiment of the present invention.

Detailed descriptions associated with the disclosed apparatus are given in the following paragraphs. FIG. 4 is a diagram illustrating a calibration apparatus applied for calibrating mismatches between a first signal path and a second signal path of a transmitter according to an embodiment of the present invention; wherein one of the first signal path and the second signal path is an I-path and the other is a Q-path. The transmitter 400 includes at least one portion (e.g. a portion or all) of an electronic device, wherein the electronic device includes at least a transmission circuit and a receiving circuit. For example, the transmitter 400 may comprise a portion of an electronic device, and more particularly, the electronic device includes at least a transmission circuit and at least a receiving circuit. In another example, the transmitter 400 can be the whole of the electronic device mentioned above. Examples of the electronic device may include, but are not limited to, a mobile phone (e.g. a multifunctional mobile phone), a mobile computer (e.g. tablet computer), a personal digital assistant (PDA), and a personal computer such as a laptop computer. For example, the transmitter 400 may be a processing module of the electronic device, such as a processor. In another example, the transmitter 400 may be the entire electronic device; however, this is for illustrative purposes, and not a limitation of the present invention. In practice, any alternative design which can achieve the same or similar functions falls within the scope of the present invention. According to an alternative design of the present invention, the transmitter 400 is a system of the electronic device, and the electronic device is a sub-system of the system. More particularly, the electronic device may include an OFDM circuit, wherein the transmitter 400 is able to calibrate the OFDM circuit, although this is not a limitation of the present invention.

As shown in FIG. 4, the transmitter 400 includes a mixer test signal generating unit 402, a low-pass filter test signal generating unit 404, a mixer calibration coefficient unit 406, a switching unit 408, a low-pass filter calibration coefficient unit 410, a tap coefficient computing unit 412, a finite impulse response (FIR) filtering unit 414, a first digital-to-analog converter (DAC) 416, a second DAC 418, a first low-pass filter 420, a second low-pass filter 422, a first mixer 424, a second mixer 426, an oscillator 428, a power amplifier 430, a receiving terminal 432, a spectrum analysis unit 434, a mixer calibration coefficient adjustment unit 436 and a low-pass filter calibration coefficient adjustment unit 438. According to the disclosed embodiment, each time after the transmitter 400 is activated (e.g. the transmitter 400 is powered on or reset) and before a normal data transmission starts, in order to improve mismatches of circuit characteristics between an I-path (i.e. the path along with the first DAC 416, the first low-pass filter 420 and the first mixer 424) and a Q-path (i.e. the path along with the second DAC 418, the second low-pass filter 422 and the second mixer 426) of a transmission terminal 440 (including at least the first DAC 416, the second DAC 418, the first low-pass filter 420, the second low-pass filter 422, the first mixer 424, the second mixer 426, and the oscillator 428) of the transmitter 400, the transmitter 400 enters into a calibration parameters computing mode. To be more specific, at the calibration parameters computing mode, calibration parameters can be optimized through a computing process with respect to the difference between the I-path and the Q-path of the transmission terminal 440 of the transmitter 400; After that, the transmission terminal 440 is allowed to enter a normal data transmission mode to transmit data by employing the additional calibration parameters derived in the above steps. This is for illustrative purposes, not a limitation of the present invention. For example, the first low-pass filter 420 and the second low-pass filter 422 of the transmitter 400 may be filters of another type.

Specifically, the first point of the calibration process of the disclosed embodiment is to add the mixer calibration coefficient unit 406 into the transmission terminal 440 of the transmitter 400, wherein the mixer calibration coefficient unit 406 may be directly or indirectly coupled to the transmission terminal 440 of the transmitter 400, and the mixer calibration coefficient unit 406 possesses a first mixer calibration coefficient X and a second mixer calibration coefficient Y. The first mixer calibration coefficient X is placed on the I-path of the transmission terminal 440 of the transmitter 400, which means that the signal passing through the I-path of the transmission terminal 440 is multiplied by the first mixer calibration coefficient X, so that the amplitude mismatch between the I-path signal and the Q-path signal induced by mixer mismatches between the I-path and the Q-path of the transmitter 440 can be calibrated. The second mixer calibration coefficient Y is placed between the I-path and the Q-path of the transmission terminal 440 of the transmitter 400, which means that the signal passing through the I-path of the transmission terminal 440 is multiplied by the second mixer calibration coefficient Y first, and then added to the signal passing through the Q-path of the transmission terminal 440, so that the phase mismatch between the I-path signal and the Q-path signal induced by mixer mismatches between the I-path and the Q-path of the transmitter 440 can be calibrated. This is for illustrative purposes, and not a limitation of the present invention. For example, more than two calibration coefficients may be employed, and its complexity and accuracy may also change accordingly. The first mixer calibration coefficient X and the second mixer calibration coefficient Y may be configured in an opposite manner (i.e. the first mixer calibration coefficient X set on the Q-path, the second mixer calibration coefficient Y set between the I-path and the Q-path, and the adder set on the I-path). Please note that, in this embodiment, an initial value of the first mixer calibration coefficient X may be set to 1, and an initial value of the second mixer calibration coefficient Y may be set to 0 as a result of the first mixer calibration coefficient X being equal to 1 and the second mixer calibration coefficient Y being equal to 0 in an ideal case without mixer mismatches. Deductions associated with how to derive the optimal value of the first mixer calibration coefficient X and the second mixer calibration coefficient Y are provided in the following paragraphs.

Specifically, the second point of the calibration process of the disclosed embodiment is adding the FIR filtering unit 414 into the transmission terminal 440 of the transmitter 400, wherein the FIR filtering unit 414 may be directly or indirectly coupled to the transmission terminal 440 of the transmitter 400, and the FIR filtering unit 414 possesses a first FIR filter 4142 and a second FIR filter 4144. The first FIR filter 4142 is used for an FIR filtering process with respect to the I-path of the transmission terminal 440; and the second FIR filter 4144 is used for an FIR filtering process with respect to the Q-path of the transmission terminal 440. Through appropriate design tap coefficients of the first FIR filter 4142 and the second FIR filter 4144, respectively, mismatches between the first low-pass filter 420 and the first DAC 416 of the I-path signal and the second low-pass filter 422 and the second DAC 418 of the Q-path signal of the transmission terminal 440 of the transmitter 400 can be solved. Please note that, in this embodiment, the tap coefficients of the first FIR filter 4142 and the second FIR filter 4144 may be configured to an initial value, to keep the signal passing through the first FIR filter 4142 and the second FIR filter 4144 untouched. In an ideal case, the tap coefficients of the first FIR filter 4142 and the second FIR filter 4144 should maintain their initial value. Deductions associated with how to derive the optimal value of the tap coefficients of the first FIR filter 4142 and the second FIR filter 4144 are provided in the following paragraphs.

In this embodiment, the mismatches aimed to be eliminated at the calibration parameters computing mode are the mismatch between the first mixer 424 and the second mixer 426, the mismatch between the first low-pass filter 420 and the second low-pass filter 422, and the mismatch between the first DAC 416 and the second DAC 418. The computation of the mismatch between the first mixer 424 and the second mixer 426 is much simpler because the first mixer 424 and the second mixer 426 operate at a fixed frequency, i.e. a local oscillator frequency $f_{osc}$ of the oscillator 428. In contrast, the computation of the mismatch between the first low-pass filter 420 and the second low-pass filter 422 and the computation of the mismatch between the first DAC 416 and the second DAC 418 is complex because they process transmission signal with wide bandwidth suffering from frequency-dependent mismatch. According to this embodiment, it is preferable to derive the first mixer calibration coefficient X and the second mixer calibration coefficient Y of the mixer calibration coefficient unit 406 first, and then to deal with the FIR filtering unit 414 based on the above basis. Before working on the mixer calibration coefficient unit 406, the mixer calibration coefficient unit 406 should be reset, and in addition, the tap coefficients of the first FIR filter 4142 and the second FIR filter 4144 of the FIR filtering unit 414 should also be reset, which avoids the characteristics of signal passing through the FIR filtering unit 414 being altered. In addition, the low-pass filter calibration coefficient unit 410 is utilized as an auxiliary tool to derive the tap coefficients of the first FIR filter 4142 and the second FIR filter 4144 of the FIR filtering unit 414. In other words, the low-pass filter calibration coefficient unit 410 is temporarily needed only when computing the tap coefficients of the FIR filtering unit 414, hence the switching 408 is configured to bypass the low-pass filter calibration coefficient unit 410 when the transmitter 400 is working on deriving the mixer calibration coefficient unit 406 or the normal data transmission and reception mode, as shown in FIG. 4. The present invention is not limited to the above mentioned configurations, however. For instance, when deriving the first mixer calibration coefficient X and the second mixer calibration coefficient Y of the mixer calibration coefficient unit 406, it is also feasible to bypass the FIR filtering unit 414, so that the first mixer calibration coefficient X and the second mixer calibration coefficient Y of the mixer calibration coefficient unit 406 cannot be affected by the FIR filtering unit 414.

Next, the mixer test signal generating unit 402 generates a first mixer calibration test signal TS1 and a second mixer calibration test signal TS2, wherein the first mixer calibration test signal TS1 is a single tone signal having a first mixer calibration test frequency formed by adding a frequency $f_{osc}$ of a local oscillator 428 of the transmitter 440 with a specific frequency $f_0$; similarly, the second mixer calibration test signal TS2 is a single tone signal having a second mixer calibration test frequency formed by subtracting a specific frequency $f_0$ from the frequency $f_{osc}$ of a local oscillator 428 of the transmitter 440. The first mixer calibration test signal TS1 passes through the mixer calibration coefficient unit 406 and bypasses the low-pass filter calibration coefficient unit 410 via the switching unit 408, and then goes through the FIR filtering unit 414 with the initial setting and the transmission terminal 440, and then loops back to the receiving terminal 432. A spectrum analysis is then performed upon the received signal by the spectrum analysis unit 434 to obtain a mixer spectrum analysis result. The mixer spectrum analysis result at least indicates information associated with an image signal corresponding to the first mixer calibration test signal TS1. Accordingly, the mixer calibration coefficient adjustment unit 436 can adjust the first mixer calibration coefficient X to reduce the image signal of the first mixer calibration test signal TS1 toward a relative minimum value. The corresponding first mixer calibration coefficient X is preserved as a first result $X_a$; and then the mixer calibration coefficient adjustment unit 436 can adjust the second mixer calibration coefficient Y to reduce the image signal of the first mixer calibration test signal TS1 toward a relative minimum value. The corresponding second mixer calibration coefficient Y is preserved as a second result $Y_a$. The details of the adjustment of the first mixer calibration coefficient X and the second mixer calibration coefficient Y may be designed according to practical considerations, such as accuracy and cost requirements. For example, a specific step size can be utilized as a unit of adjustment.

The second mixer calibration test signal TS2 also passes through the mixer calibration coefficient unit 406 and bypasses the low-pass filter calibration coefficient unit 410 by the switching unit 408, and then passes through the FIR filtering unit 414 with the initial setting and the transmission terminal 440, and loops back to the receiving terminal 432. A spectrum analysis is performed upon the received signal by the spectrum analysis unit 434 to obtain a mixer spectrum analysis result. The mixer spectrum analysis result at least indicates information associated with an image signal of the second mixer calibration test signal TS2. Accordingly, the mixer calibration coefficient adjustment unit 436 can adjust the first mixer calibration coefficient X to reduce the image signal of the second mixer calibration test signal TS2 toward a relative minimum value. The corresponding first mixer calibration coefficient X is preserved as a third result $X_b$; the mixer calibration coefficient adjustment unit 436 can then adjust the second mixer calibration coefficient Y to reduce the image signal of the second mixer calibration test signal TS2 toward a relative minimum value. The corresponding second mixer calibration coefficient Y is preserved as a fourth result $Y_b$. Lastly, the final value of the first mixer calibration coefficient X can be obtained by averaging the first result $X_a$ and the third result $X_b$; and the final value of the second mixer calibration coefficient Y can be obtained by averaging the second result $Y_a$ and the fourth result $Y_b$. It should be noted that the derived first mixer calibration coefficient X and the second mixer calibration coefficient Y here are approximated values rather than ideal values, i.e. the approximated values come from averaging the calibration results of the first mixer calibration test frequency ($f_{osc}+f_o$) and the second mixer calibration test frequency ($f_{osc}-f_0$).

Next, the mismatch between the first low-pass filter 420 and the second low-pass filter 422 are dealt with at the calibration parameters computing mode in the subsequent step. As mentioned above, the first FIR filter 4142 coupled to the I-path of the transmission terminal 440 is utilized to perform the I-path FIR filtering process upon the I-path; and the second FIR filter 4144 coupled to the Q-path of the transmission terminal 440 is utilized to perform the Q-path FIR filtering process upon the Q-path, to calibrate the mismatch between the first low-pass filter 420 and the second low-pass filter 422 and the mismatch between the first DAC 416 and the second DAC 418. The main purpose is to compensate the mismatches between the I-path and the Q-path, which means that the second FIR filter 4144 may be fixed and only the first FIR filter 4142 is utilized for compensation in practice; or vice versa. For example, a delay chain can be used to implement the second FIR filter 4144, wherein the delay chain merely performs a signal delay process upon the signal of the Q-path. The delay time of the second FIR filter 4144 is designed to equal the delay time of the first FIR filter 4142, to make sure the delay time of the signals on both paths are equivalent to each other.

Figure 5:
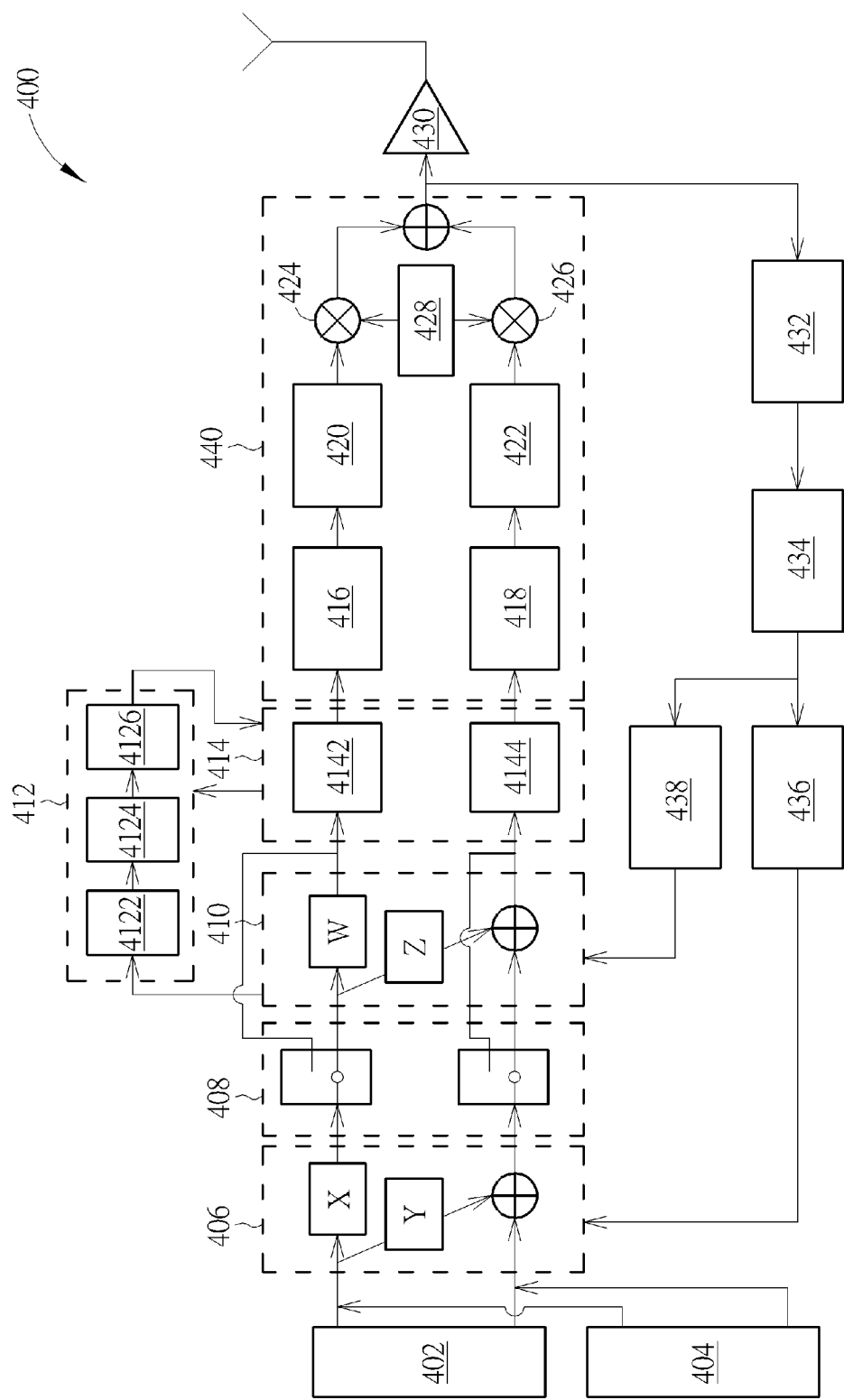
FIG. 5 is a diagram illustrating the calibration apparatus of FIG. 4 in another configuration.

The tap coefficient adjustment of the first FIR filter 4142 and the second FIR filter 4144 are described in the following paragraphs. FIG. 5 is a diagram illustrating the calibration apparatus of FIG. 4 in another configuration. Specifically, the switching unit 408 is switched to turn on another path as shown in FIG. 5, which is a special setting for computing results of the low-pass filter calibration coefficient unit 410 corresponding to different low-pass filter calibration test frequencies; the tap coefficients of the first FIR filter 4142 and the second FIR filter 4144 can then be derived in a reverse manner. According to FIG. 5, the signal which passes through the I-path can now pass the low-pass filter coefficient unit 410 by the switching unit 408. The low-pass filter coefficient unit 410 includes a first low-pass filter calibration coefficient W and a second low-pass filter calibration coefficient Z. The first low-pass filter calibration coefficient W is coupled to the I-path of the transmission terminal 440, for calibrating the amplitude mismatch between the signals of the I-path and the Q-path induced by the mismatch between the first low-pass filter 420 of the I-path of the transmission terminal 440 and the second low-pass filter 422 of the Q-path of the transmission terminal 440. The second low-pass filter calibration coefficient Z is coupled between the I-path and the Q-path of the transmission terminal 440, for calibrating the phase mismatch between the signals of the I-path and the Q-path induced by the mismatch between the first low-pass filter 420 of the I-path of the transmission terminal 440 and the second low-pass filter 422 of the Q-path of the transmission terminal 440. This is for illustrative purposes only, and not a limitation of the present invention. Details of the adjustment of the first low-pass filter calibration coefficient W and the second low-pass filter calibration coefficient Z may be designed according to practical considerations, such as accuracy and cost requirements. Moreover, the first low-pass filter calibration coefficient W and the second low-pass filter calibration coefficient Z are interchangeable.

The low-pass filter test signal generating unit 404 transmits N low-pass filter test signals $TSL_1$~$TSL_N$, wherein N can be any number greater than 0. The low-pass filter test signals $TSL_1$~$TSL_N$ go through the mixer calibration coefficient unit 406, the switching unit 408, the low-pass filter coefficient unit 410, and then go through the FIR filtering unit 414 with the initial setting and the transmission terminal 440, and loop back to the receiving terminal 432. A spectrum analysis is performed upon the received signal by the spectrum analysis unit 434 to obtain a plurality of low-pass filter spectrum analysis results. The low-pass filter spectrum analysis results at least indicate information associated with a plurality of image signals corresponding to the low-pass filter test signals $TSL_1$~$TSL_N$. It should be noted that the low-pass filter test signals $TSL_1$~$TSL_N$ are single tone signals having low-pass filter calibration test frequencies $f_{tsl1}$~$f_{tslN}$, respectively. Since only the mismatches occuring at the normal mode of the transmitter 400 are under consideration, the low-pass filter calibration test frequencies $f_{tsl1}$~$f_{tslN}$ may be within the target bandwidth of the normal node of the transmitter 400. The number and distribution of the low-pass filter calibration test frequencies $f_{tsl1}$~$f_{tslN}$ can directly influence the calibration accuracy of the first FIR filter 4142 and the second FIR filter 4144. The tap number and the allocation of the low-pass filter calibration test frequencies $f_{tsl1}$~$f_{tslN}$ of the first FIR filter 4142 and the second FIR filter 4144 should be designed based on comprehensive considerations regarding cost and accuracy desired.

For each of the low-pass filter test signals $TSL_1$~$TSL_N$, the low-pass filter calibration coefficient adjustment unit 438 can adjust the first low-pass filter calibration coefficient W to reduce the image signal toward a relative minimum value. The corresponding first low-pass filter calibration coefficient W is preserved as first low-pass filter results $W_1$~$W_N$; and then the low-pass filter calibration coefficient adjustment unit 438 can adjust the second low-pass filter calibration coefficient Z to reduce the image signal toward a relative minimum value. The corresponding second low-pass filter calibration coefficient Z is preserved as second low-pass filter results $Z_1$~$Z_N$. After the first low-pass filter results $W_1$~$W_N$ and the second low-pass filter results $Z_1 \sim Z_N$ are completely derived, the tap coefficient computing unit 412 can therefore derive the tap coefficients of the first FIR filter 4142 and the second FIR filter 4144. Details are given in the following paragraphs.

A Q-path frequency response computing unit 4122 of the tap coefficient computing unit 412 performs a Fourier transform upon the second FIR filter 4144 of the Q-path. In practice, it is feasible to perform an N-point fast Fourier transform (FFT) upon the second FIR filter 4144 at the low-pass filter calibration test frequencies $f_{tsl1} \sim f_{tslN}$, respectively, to obtain a plurality of frequency responses $B_1 \sim B_N$ corresponding to the low-pass filter calibration test frequencies $f_{tsl1} \sim f_{tslN}$. Equation (3) below is based on equation (1) and (2), and the concept of equation (3) is to derive the I-path frequency responses $A_1 \sim A_N$ according to the plurality of frequency responses $B_1 \sim B_N$, the first low-pass filter results $W_1 \sim W_N$ and the second low-pass filter results $Z_1 \sim Z_N$ corresponding to the low-pass filter calibration test frequencies $f_{tsl1} \sim f_{tslN}$.

$$A_i = B_i \times \frac{1}{R_i} \times \exp(-j\Phi) \qquad (3)$$
$$= B_i \times W_i \times \cos(-\arctan(Z_i)) \times \exp(j\arctan(Z_i))$$

where $i=1 \sim N$.

Figure 6:
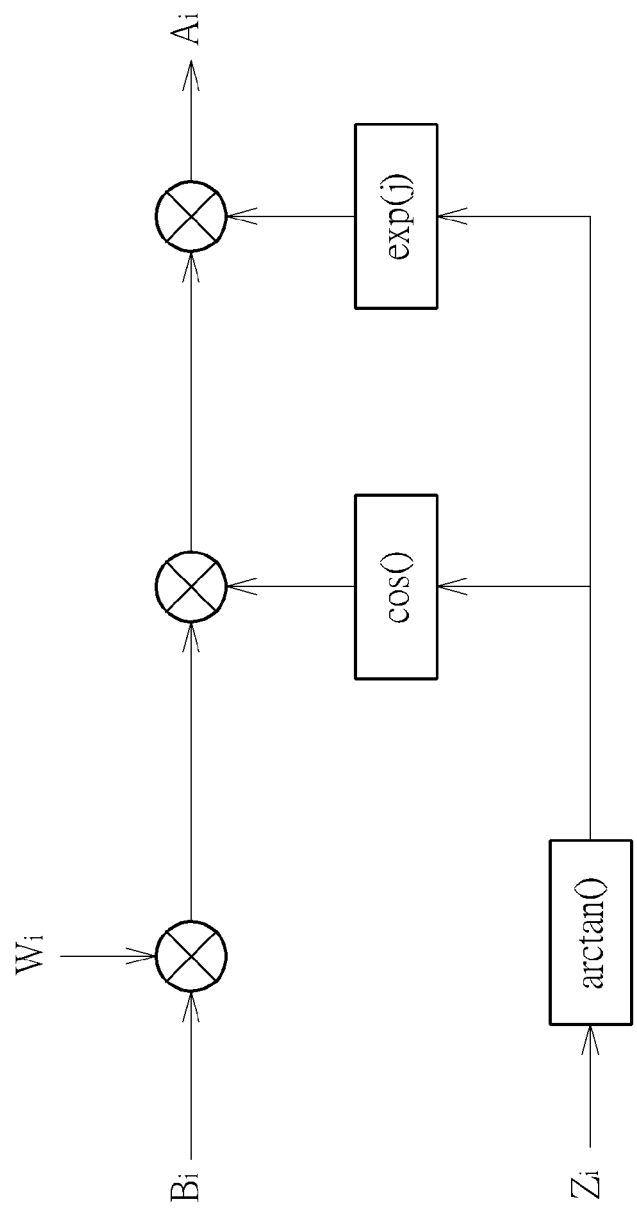
FIG. 6 is a diagram illustrating the first I-path frequency response computing unit according to an embodiment of the present invention.

FIG. 6 is a diagram illustrating the first I-path frequency response computing unit according to an embodiment of the present invention. Please note that the first I-path frequency response computing unit 4124 shown in FIG. 6 is based on equation (3). In practice, equation (3) can be further simplified as equation (4) below by approximation.

$$\begin{aligned} A_i &= B_i \times W_i \times \cos(-\arctan(Z_i)) \times \exp(j\arctan(Z_i)) \qquad (4) \\ &\sim = B_i \times W_i \times \cos(Z_i) \times (\cos(Z_i) + j\sin(Z_i)) \\ &\sim = B_i \times W_i \times \left(1 - \frac{Z_i^2}{2}\right)\left(\left(1 - \frac{Z_i^2}{2}\right) + jZ_i\right), \end{aligned}$$

where $i=1-N$.

Figure 7:
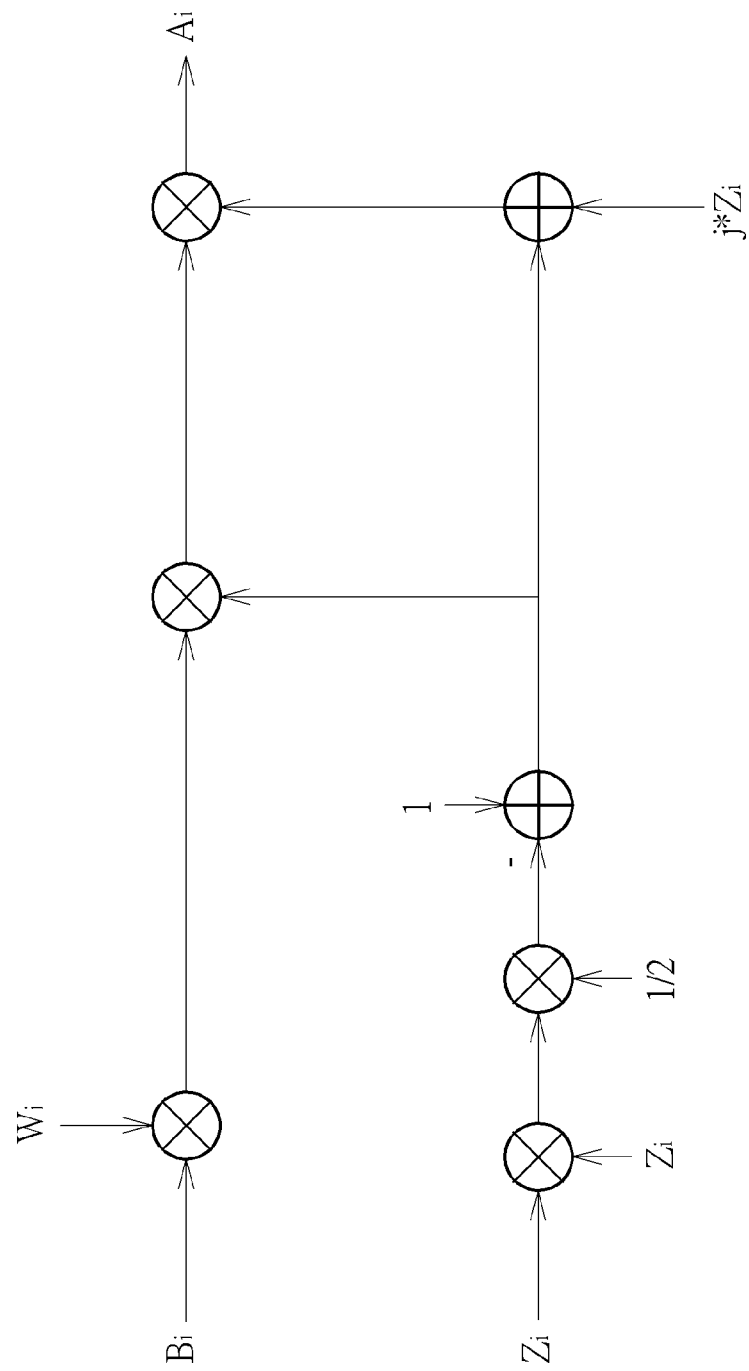
FIG. 7 is a diagram illustrating the first I-path frequency response computing unit according to another embodiment of the present invention.

FIG. 7 is a diagram illustrating the first I-path frequency response computing unit according to another embodiment of the present invention. Please note that the first I-path frequency response computing unit 4124 shown in FIG. 7 is based on equation (4).

A coefficient computing unit 4126 of the tap coefficient computing unit 412 performs the inverse Fourier transform upon the I-path frequency response $A_1 \sim A_N$, and a real part of the inverse transform result is used as the tap coefficients of the first FIR filter 4142. In practice, it is feasible to perform an inverse fast Fourier transform (iFFT) upon the I-path frequency response $A_1 \sim A_N$, respectively, to obtain the tap coefficients of the first FIR filter 4142.

According to the above deductions, the final result of the FIR filtering unit 414 is the first FIR filter 4142, wherein the tap coefficients are derived as above; and the second FIR filter 4144 is the delay chain wherein the delay time is the same as that of the first FIR filter 4142. At this point, all the essential calibration parameters of the transmission terminal 440 of this embodiment are ready. The transmitter 400 can perform the normal data transmission and reception by switching the switching unit 408 back to the configuration of FIG. 4. The difference is that the performance of the transmitter 440 can be improved with the help of the mixer calibration coefficient unit 406 and the FIR filtering unit 414.

Figure 8:
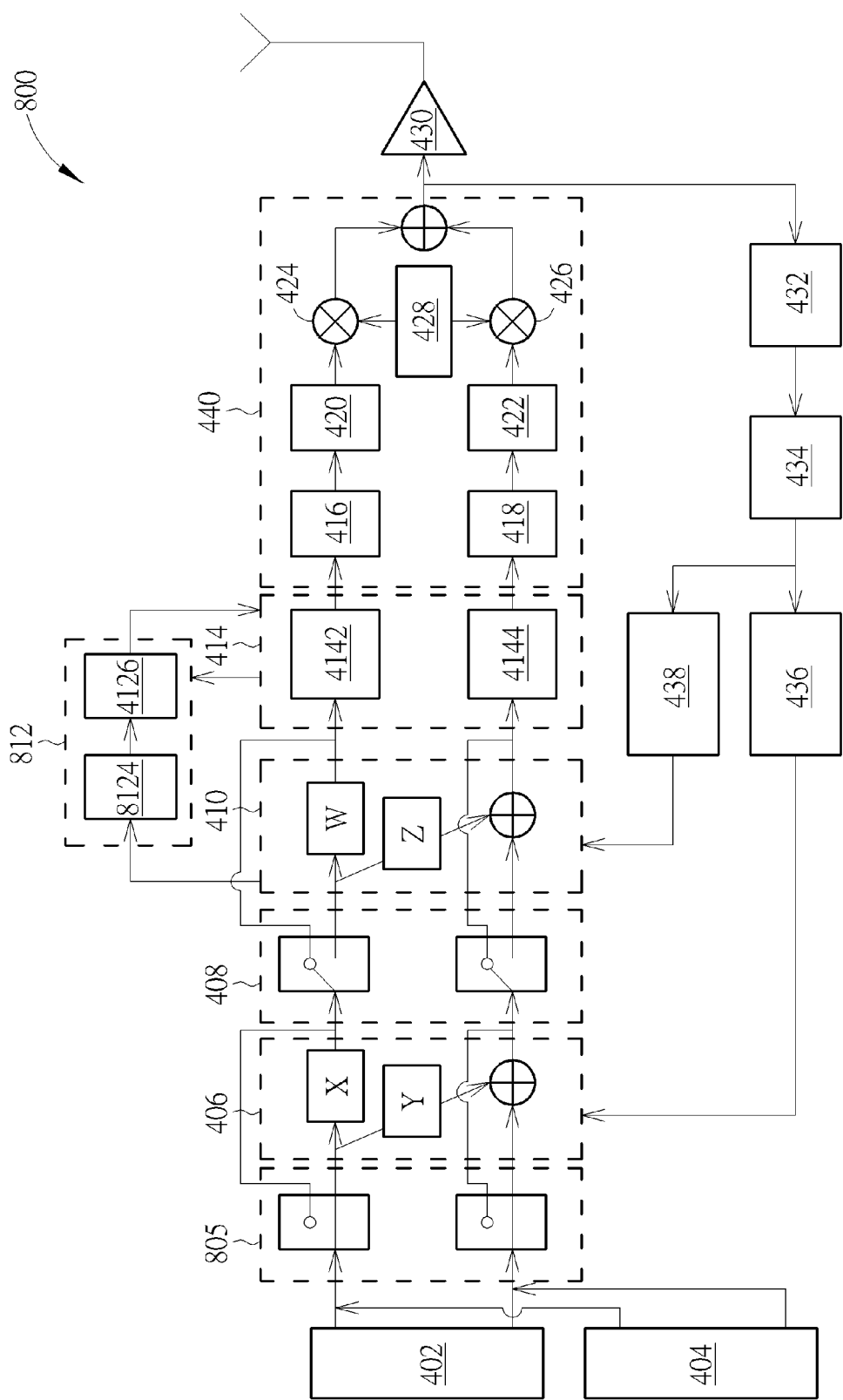
FIG. 8 is a diagram illustrating a calibration apparatus applied for calibrating mismatches between a first signal path and a second signal path of a transmitter according to another embodiment of the present invention.
Figure 9:
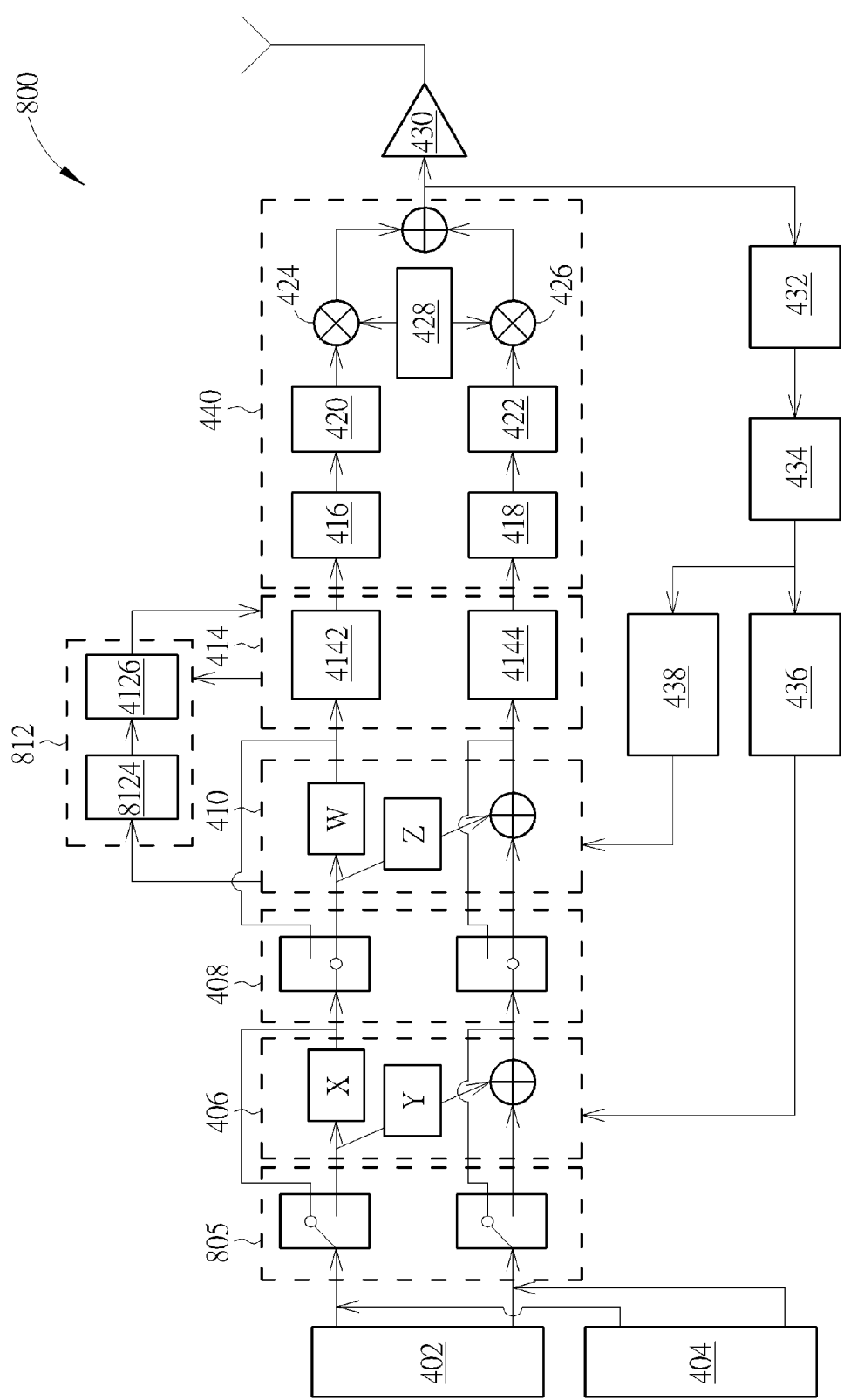
FIG. 9 is a diagram illustrating the calibration apparatus of FIG. 8 in another configuration.

FIG. 8 is a diagram illustrating a calibration apparatus applied for calibrating mismatches between a first signal path and a second signal path of a transmitter according to another embodiment of the present invention; wherein one of the first signal path and the second signal path is an I-path; and the other is a Q-path. The difference between the transmitter 800 of FIG. 8 and the transmitter 400 of FIG. 4 is that a second I-path frequency response computing unit 8124 of a tap coefficient computing unit 812 of the transmitter 800 can replace the Q-path frequency response computing unit 4122 and the first I-path frequency response computing unit 4124. In addition, a switching unit 805 is located before the mixer calibration coefficient unit 406. Please note that the configuration of FIG. 8 is for deriving the first coefficient X and the second coefficient Y, wherein the switching mode of the switching unit 805 and the switching mode of the switching unit 408 are presented. In other words, a test signal generated by the mixer test signal generating unit 402 passes the mixer calibration coefficient unit 406, but does not pass the low-pass filter calibration coefficient unit 410. FIG. 9 is a diagram illustrating the calibration apparatus of FIG. 8 in another configuration. Specifically, both the switching unit 805 and the switching unit 408 are switched to turn on another path as shown in FIG. 8, i.e. the test signal generated by the mixer test signal generating unit 402 does not pass the mixer calibration coefficient unit 406, but does pass the low-pass filter calibration coefficient unit 410. Related descriptions regarding the rest of the operations can be found in previous paragraphs and are therefore omitted here for brevity. As for the tap coefficient computing unit 812, compared with the tap coefficient computing unit 412, the I-path frequency responses $A_1 \sim A_N$ can be directly derived by the tap coefficient computing unit 812 according to the first low-pass filter results $W_1 \sim W_N$, the second low-pass filter results $Z_1 \sim Z_N$ corresponding to the low-pass filter calibration test frequencies $f_{tsl1} \sim f_{tslN}$, the first mixer calibration coefficient X and the second mixer calibration coefficient Y.

$$\begin{aligned} A_i &= \frac{W_i}{1+Z_i}(1+jY)(1-jZ_i)X^{-1} \qquad (5) \\ &= \cos^2(\arctan(Z_i))W_i(1+jY)(1-jZ_i)X^{-1} \end{aligned}$$

where $i=1 \sim N$.

Figure 10:
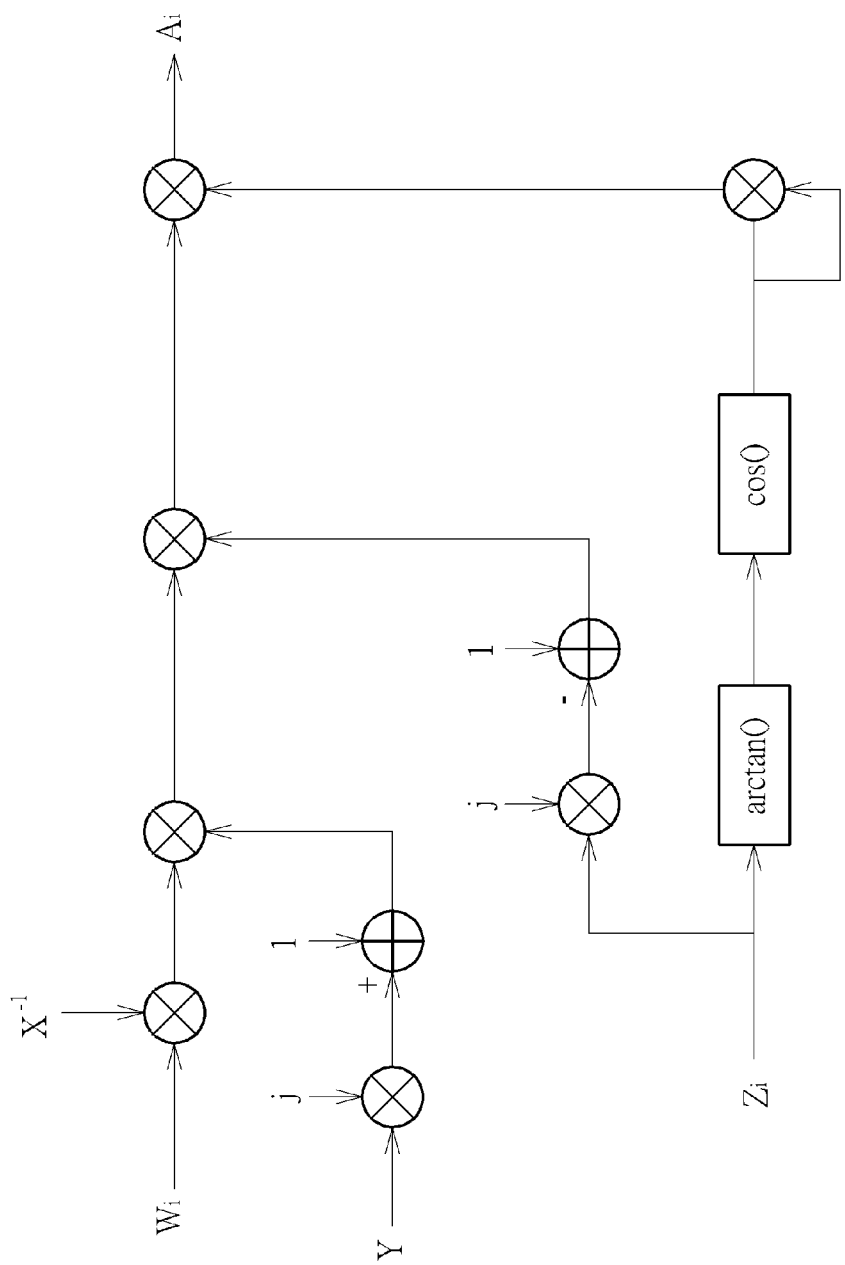
FIG. 10 is a diagram illustrating the second I-path frequency response computing unit according to an embodiment of the present invention.

FIG. 10 is a diagram illustrating the second I-path frequency response computing unit according to an embodiment of the present invention. It should be noted that the second I-path frequency response computing unit 8124 shown in FIG. 10 is based on equation (5). In practice, equation (5) can be further simplified as equation (6) below by utilizing the Taylor series to expand $\cos^2(\arctan(Z_i))$ to $(1-Z_i^2+Z_i^4+\ldots)$, wherein the first terms are preserved.

$$\begin{aligned} A_i &= \cos^2(\arctan(Z_i))W_i(1+jY)(1-jZ_i)X^{-1} \qquad (6) \\ &\approx \left(1 - \frac{Z_i^2}{2} + \frac{3}{8}W_i^4\right)^2 W_i(1+jY)(1-jZ_i)X^{-1} \\ &\approx (1 - Z_i^2 + Z_i^4)(1+jY)(1-jZ_i) \\ &= W_iX^{-1}(1 - Z_i^2 + Z_i^4)(1 + YZ_i + j(Y - Z_i)) \end{aligned}$$

Figure 11:
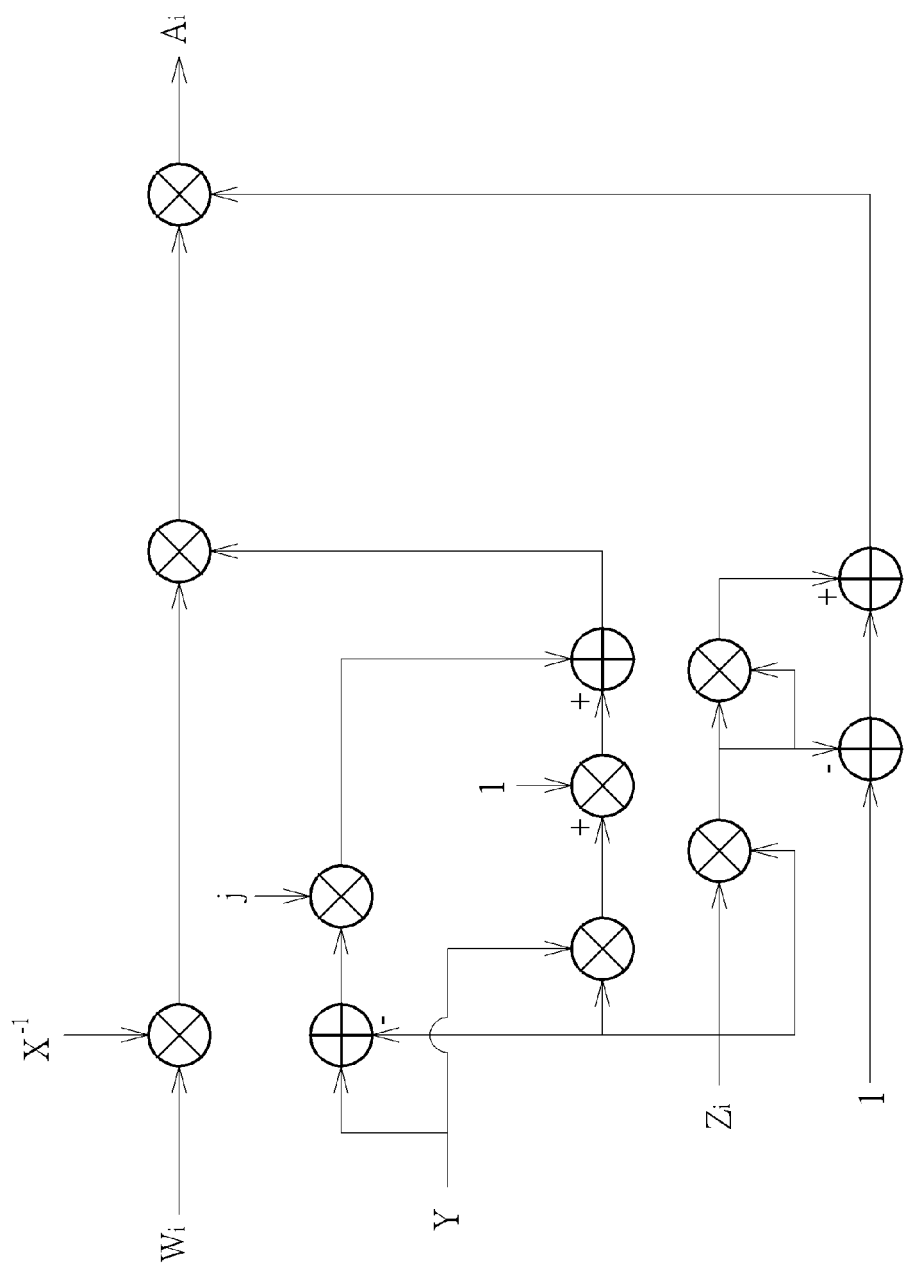
FIG. 11 is a diagram illustrating the second I-path frequency response computing unit according to another embodiment of the present invention.

FIG. 11 is a diagram illustrating the second I-path frequency response computing unit according to another embodiment of the present invention. It should be noted that the second I-path frequency response computing unit 8124 shown in FIG. 11 is based on equation (6).

Figure 12:
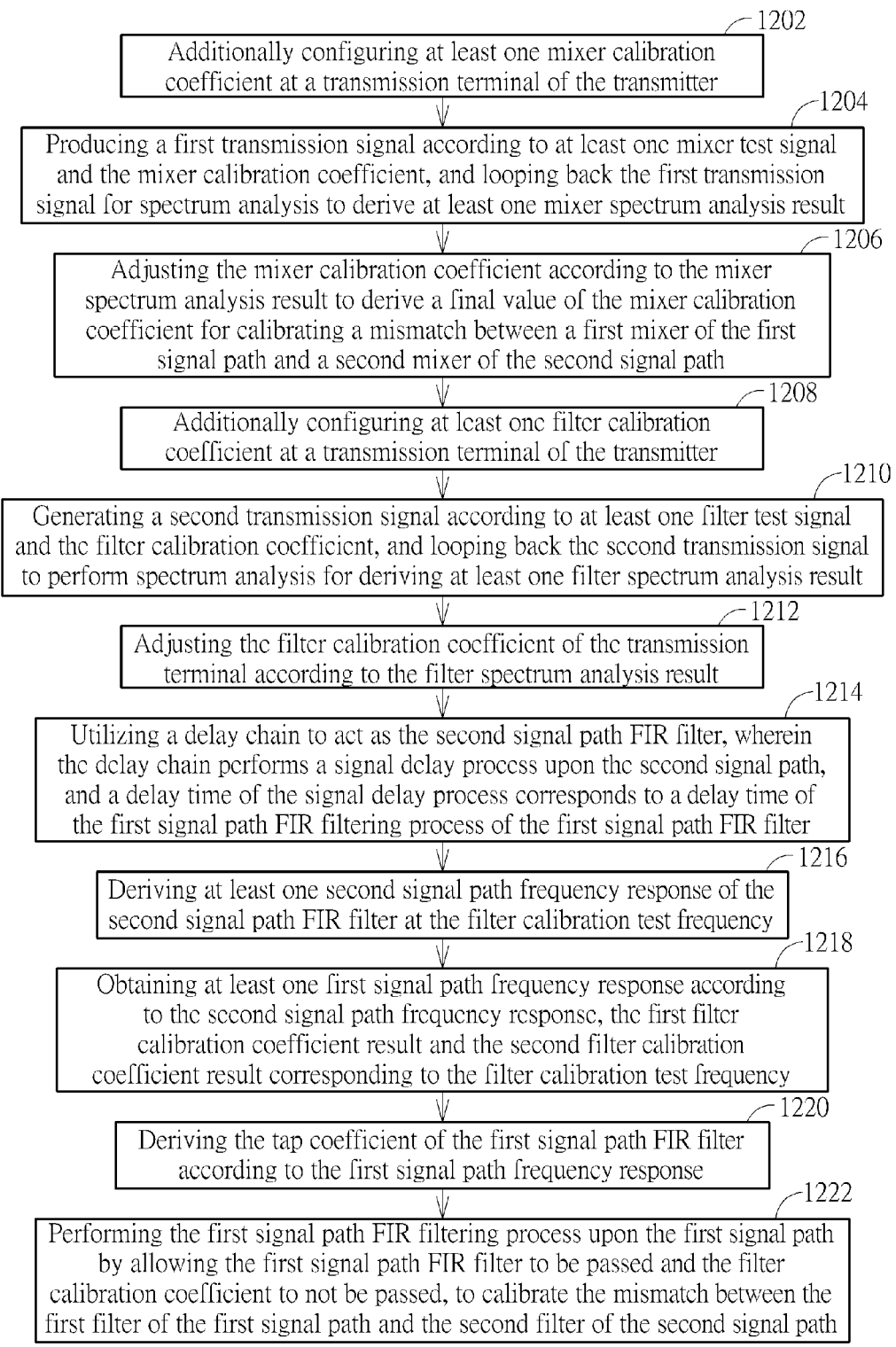
FIG. 12 is a flowchart illustrating a calibration method applied for calibrating mismatches between a first signal path and a second signal path of a transmitter according to an embodiment of the present invention.

FIG. 12 is a flowchart illustrating a calibration method applied for calibrating mismatches between a first signal path and a second signal path of a transmitter according to an embodiment of the present invention; wherein one of the first signal path and the second signal path is an I-path; and the other is a Q-path. Provided that substantially the same result is achieved, the steps in FIG. 12 need not be in the exact order shown and need not be contiguous; that is, other steps can be intermediate. Some steps in FIG. 12 may be omitted according to various embodiments or requirements. The calibration method shown in FIG. 12 can be applied to the transmitter 400 shown in FIG. 4 and FIG. 5. Details of the calibration method are described as follows.

Step 1202: additionally configuring at least one mixer calibration coefficient at a transmission terminal of the transmitter;

Step 1204: producing a first transmission signal according to at least one mixer test signal and the mixer calibration coefficient, and looping back the first transmission signal for spectrum analysis to derive at least one mixer spectrum analysis result;

Step 1206: adjusting the mixer calibration coefficient according to the mixer spectrum analysis result to derive a final value of the mixer calibration coefficient for calibrating a mismatch between a first mixer of the first signal path and a second mixer of the second signal path;

Step 1208: additionally configuring at least one filter calibration coefficient at a transmission terminal of the transmitter;

Step 1210: generating a second transmission signal according to at least one filter test signal and the filter calibration coefficient, and looping back the second transmission signal to perform spectrum analysis for deriving at least one filter spectrum analysis result;

Step 1212: adjusting the filter calibration coefficient of the transmission terminal according to the filter spectrum analysis result;

Step 1214: utilizing a delay chain to act as the second signal path FIR filter, wherein the delay chain performs a signal delay process upon the second signal path, and a delay time of the signal delay process corresponds to a delay time of the first signal path FIR filtering process of the first signal path FIR filter;

Step 1216: deriving at least one second signal path frequency response of the second signal path FIR filter at the filter calibration test frequency;

Step 1218: obtaining at least one first signal path frequency response according to the second signal path frequency response, the first filter calibration coefficient result and the second filter calibration coefficient result corresponding to the filter calibration test frequency;

Step 1220: deriving the tap coefficient of the first signal path FIR filter according to the first signal path frequency response; and Step 1222: performing the first signal path FIR filtering process upon the first signal path by allowing the first signal path FIR filter to be passed and the filter calibration coefficient to not be passed, to calibrate the mismatch between the first filter of the first signal path and the second filter of the second signal path.

Those skilled in the art will readily understand the calibration method shown in FIG. 12 after reading the above paragraphs regarding the transmitter 400 shown in FIG. 4 and FIG. 5. Further description is therefore omitted here for brevity.

Figure 13:
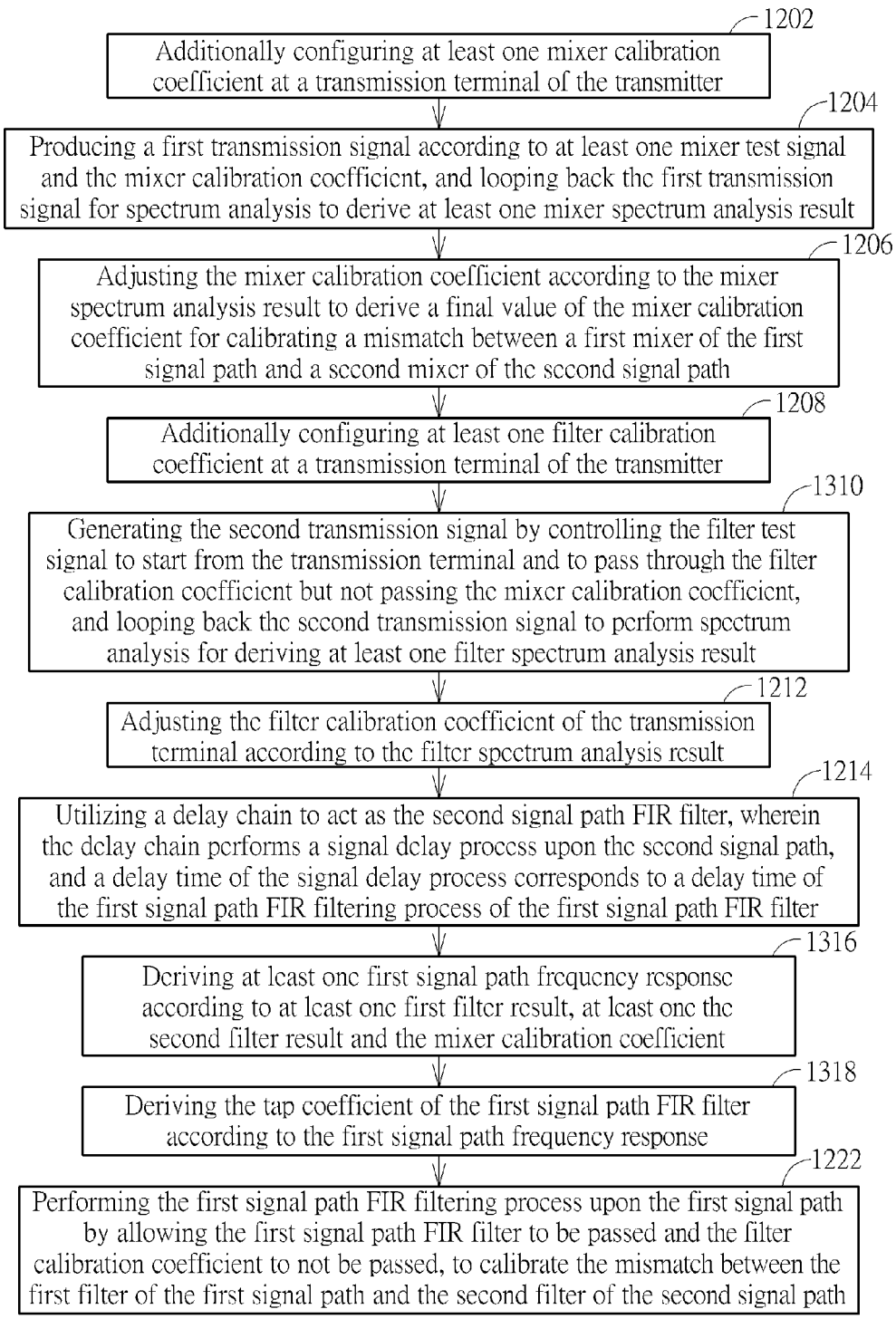
FIG. 13 is a flowchart illustrating a calibration method applied for calibrating mismatches between a first signal path and a second signal path of a transmitter according to another embodiment of the present invention.

FIG. 13 is a flowchart illustrating a calibration method applied for calibrating mismatches between a first signal path and a second signal path of a transmitter according to another embodiment of the present invention; wherein one of the first signal path and the second signal path is an I-path; and the other is a Q-path. Provided that substantially the same result is achieved, the steps in FIG. 13 need not be in the exact order shown and need not be contiguous; that is, other steps can be intermediate. Some steps in FIG. 13 may be omitted according to various embodiments or requirements. The calibration method shown in FIG. 13 can be applied to the transmitter 800 shown in FIG. 8 and FIG. 9. Details of the calibration method are described as follows.

Step 1202: additionally configuring at least one mixer calibration coefficient at a transmission terminal of the transmitter;

Step 1204: producing a first transmission signal according to at least one mixer test signal and the mixer calibration coefficient, and looping back the first transmission signal for spectrum analysis to derive at least one mixer spectrum analysis result;

Step 1206: adjusting the mixer calibration coefficient according to the mixer spectrum analysis result to derive a final value of the mixer calibration coefficient for calibrating a mismatch between a first mixer of the first signal path and a second mixer of the second signal path;

Step 1208: additionally configuring at least one filter calibration coefficient at a transmission terminal of the transmitter;

Step 1310: generating the second transmission signal by controlling the filter test signal to start from the transmission terminal and to pass through the filter calibration coefficient but not passing the mixer calibration coefficient, and looping back the second transmission signal to perform spectrum analysis for deriving at least one filter spectrum analysis result;

Step 1212: adjusting the filter calibration coefficient of the transmission terminal according to the filter spectrum analysis result;

Step 1214: utilizing a delay chain to act as the second signal path FIR filter, wherein the delay chain performs a signal delay process upon the second signal path, and a delay time of the signal delay process corresponds to a delay time of the first signal path FIR filtering process of the first signal path FIR filter;

Step 1316: deriving at least one first signal path frequency response according to at least one first filter result, at least one the second filter result and the mixer calibration coefficient;

Step 1318: deriving the tap coefficient of the first signal path FIR filter according to the first signal path frequency response; and Step 1222: performing the first signal path FIR filtering process upon the first signal path by allowing the first signal path FIR filter to be passed and the filter calibration coefficient to not be passed, to calibrate the mismatch between the first filter of the first signal path and the second filter of the second signal path.

Those skilled in the art will readily understand the calibration method shown in FIG. 13 after reading the above paragraphs regarding the transmitter 800 shown in FIG. 8 and FIG. 9. Further description is therefore omitted here for brevity.

Figure 14:
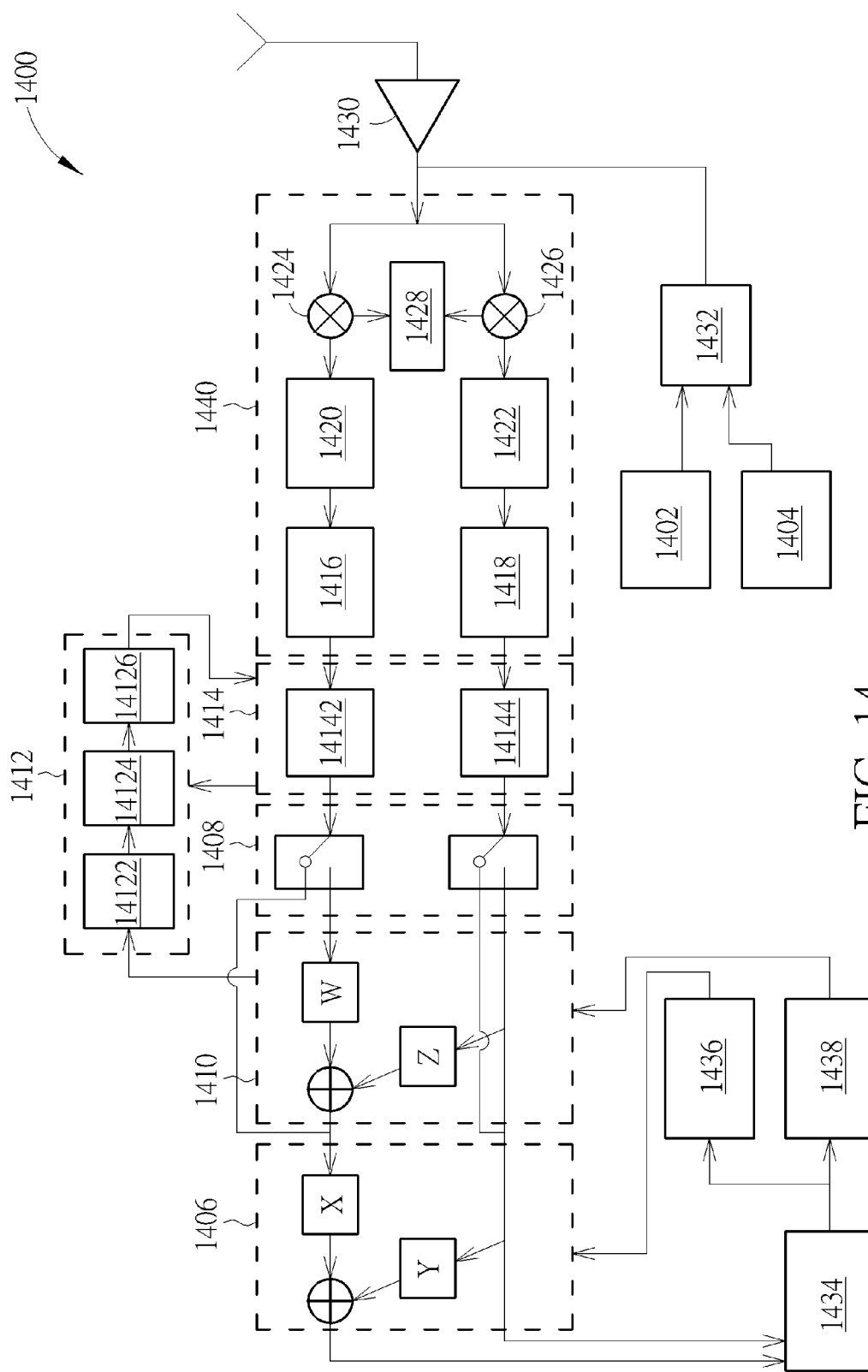
FIG. 14 is a diagram illustrating a calibration apparatus applied for calibrating mismatches between a first signal path and a second signal path of a receiver according to an embodiment of the present invention.

FIG. 14 is a diagram illustrating a calibration apparatus applied for calibrating mismatches between a first signal path and a second signal path of a receiver according to an embodiment of the present invention; wherein one of the first signal path and the second signal path is an I-path; and the other is a Q-path. The receiver 1400 includes at least one portion (e.g. a portion or all) of an electronic device, wherein the electronic device includes at least a transmission circuit and a receiving circuit. For example, the receiver 1400 may comprise a portion of an electronic device, and more particularly, the electronic device includes at least a transmission circuit and at least a receiving circuit. In another example, the receiver 1400 can be the whole of the electronic device mentioned above. Examples of the electronic device may include, but are not limited to, a mobile phone (e.g. a multifunctional mobile phone), a mobile computer (e.g. tablet computer), a personal digital assistant (PDA), and a personal computer such as a laptop computer. For example, the receiver 1400 may be a process module of the electronic device, such as a processor. In another example, the receiver 1400 may be the entire electronic device; however, this is for illustrative purposes, and not a limitation of the present invention. According to an alternative design of the present invention, the receiver 1400 is a system of the electronic device, and the electronic device is a sub-system of the system. More particularly, the electronic device may include an OFDM circuit, wherein the receiver 1400 is able to calibrate the OFDM circuit, although this is not a limitation of the present invention.

As shown in FIG. 14, the receiver 1400 includes a mixer test signal generating unit 1402, a low-pass filter test signal generating unit 1404, a mixer calibration coefficient unit 1406, a switching unit 1408, a low-pass filter calibration coefficient unit 1410, a tap coefficient computing unit 1412, an FIR filtering unit 1414, a first analog-to-digital converter (ADC) 1416, a second ADC 1418, a first low-pass filter 1420, a second low-pass filter 1422, a first mixer 1424, a second mixer 1426, an oscillator 1428, a low-noise amplifier 1430, a transmission terminal 1432, a spectrum analysis unit 1434, a mixer calibration coefficient adjustment unit 1436 and a low-pass filter calibration coefficient adjustment unit 1438. According to the disclosed embodiment, each time after the receiver 1400 is activated (e.g. the receiver 1400 is powered on or reset) and before a normal data transmission starts, in order to improve mismatches of circuit characteristics between an I-path (i.e. the path of the first mixer 1424, the first low-pass filter 1420 and the first ADC 1416) and a Q-path (i.e. the path of the second mixer 1426, the second low-pass filter 1422 and the second ADC 1418) of a receiving terminal 1440 (including at least the first ADC 1416, the second ADC 1418, the first low-pass filter 1420, the second low-pass filter 1422, the first mixer 1424, the second mixer 1426, and the oscillator 1428) of the receiver 1400, the receiver 1400 enters into a calibration parameters computing mode. To be more specific, at the calibration parameters computing mode, calibration parameters can be optimized through a computing process with respect to the difference between the I-path and the Q-path of the receiving terminal 1440 of the receiver 1400. After that, the receiving terminal 1440 is allowed to enter a normal data receiving mode to receive data by employing the additional calibration parameters derived by above steps. This is for illustrative purposes, however, and not a limitation of the present invention. For example, the first low-pass filter 1420 and the second low-pass filter 1422 of the receiver 1400 may be filters of another type.

The principles of the calibration process regarding the first mixer 1424, the second mixer 1426, the first low-pass filter 1420, second low-pass filter 1422, the first analog-to-digital converter 1416 and the second analog-to-digital converter 1418 of the receiving terminal 1440 of the receiver 1400 of FIG. 14 are substantially the same as those of the first mixer 424, the second mixer 426, the first low-pass filter 420, the second low-pass filter 422, the first digital-to-analog converter 416 and the second digital-to-analog converter 418 of the transmission terminal 440 of the transmitter 400 of FIG. 4. Those skilled in the art will readily understand the details of the operation of the receiver 1400 shown in FIG. 14 after reading the above paragraphs regarding the transmitter 400 shown in FIG. 4 and FIG. 5. Further description is therefore omitted here for brevity.

Figure 15:
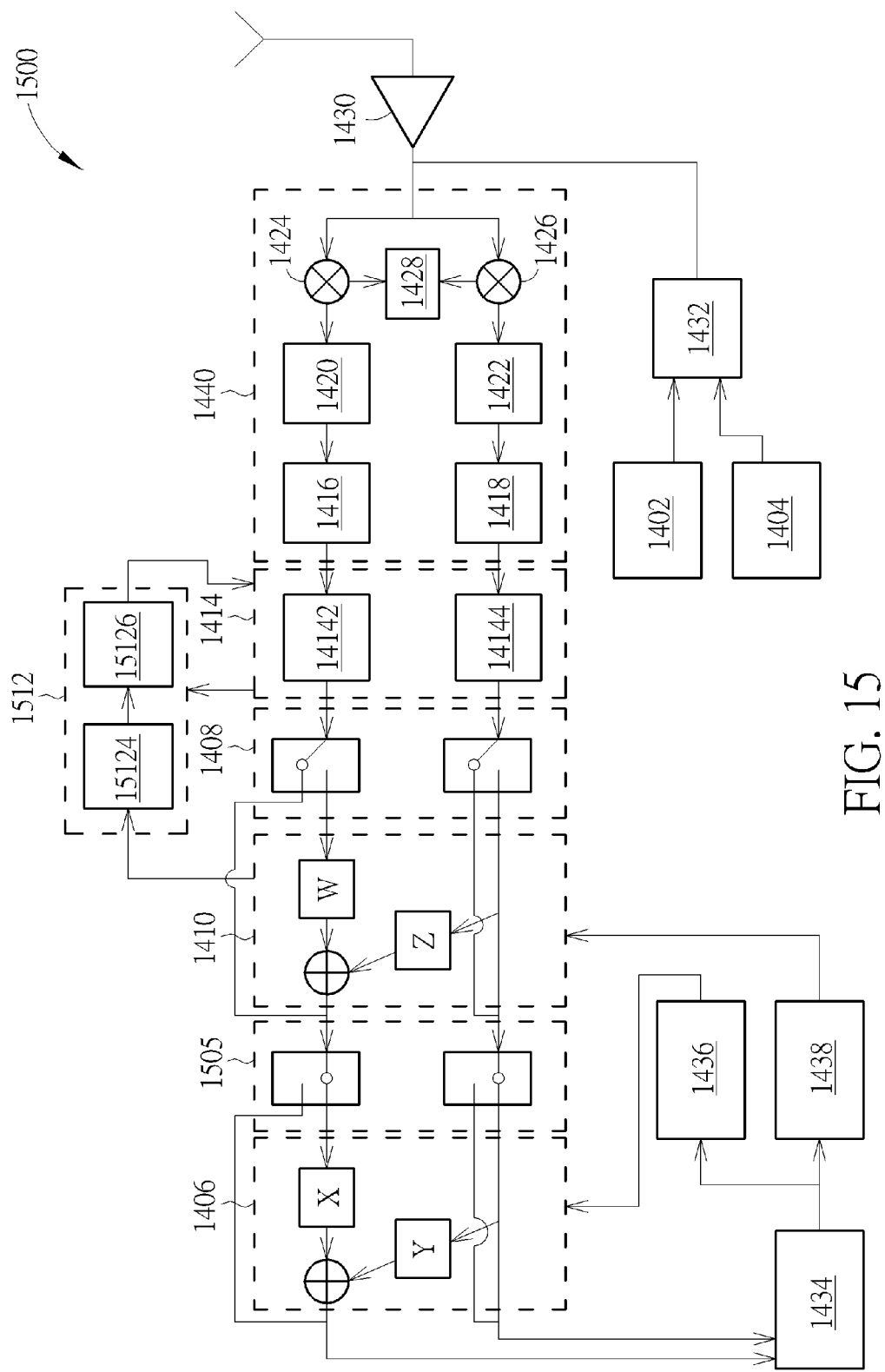
FIG. 15 is a diagram illustrating a calibration apparatus applied for calibrating mismatches between a first signal path and a second signal path of a receiver according to another embodiment of the present invention.

FIG. 15 is a diagram illustrating a calibration apparatus applied for calibrating mismatches between a first signal path and a second signal path of a receiver according to another embodiment of the present invention; wherein one of the first signal path and the second signal path is an I-path; and the other is a Q-path. The difference between the receiver 1400 of FIG. 14 and the receiver 1500 of FIG. 15 is that a second I-path frequency response computing unit 15124 of a tap coefficient computing unit 1512 of the receiver 1500 can replace the Q-path frequency response computing unit 14122 and the first I-path frequency response computing unit 14124. The principles of the calibration process regarding the tap coefficient computing unit 1512 of the receiving terminal 1440 of the receiver 1500 of FIG. 15 are substantially the same as those of the tap coefficient computing unit 812 of the transmitter 800 of FIG. 8. Those skilled in the art will readily understand the details of the operation of the second I-path frequency response computing unit 15124 shown in FIG. 15 after reading the above paragraphs regarding FIG. 8 and FIG. 10~FIG. 11. Further description is therefore omitted here for brevity.

Figure 16:
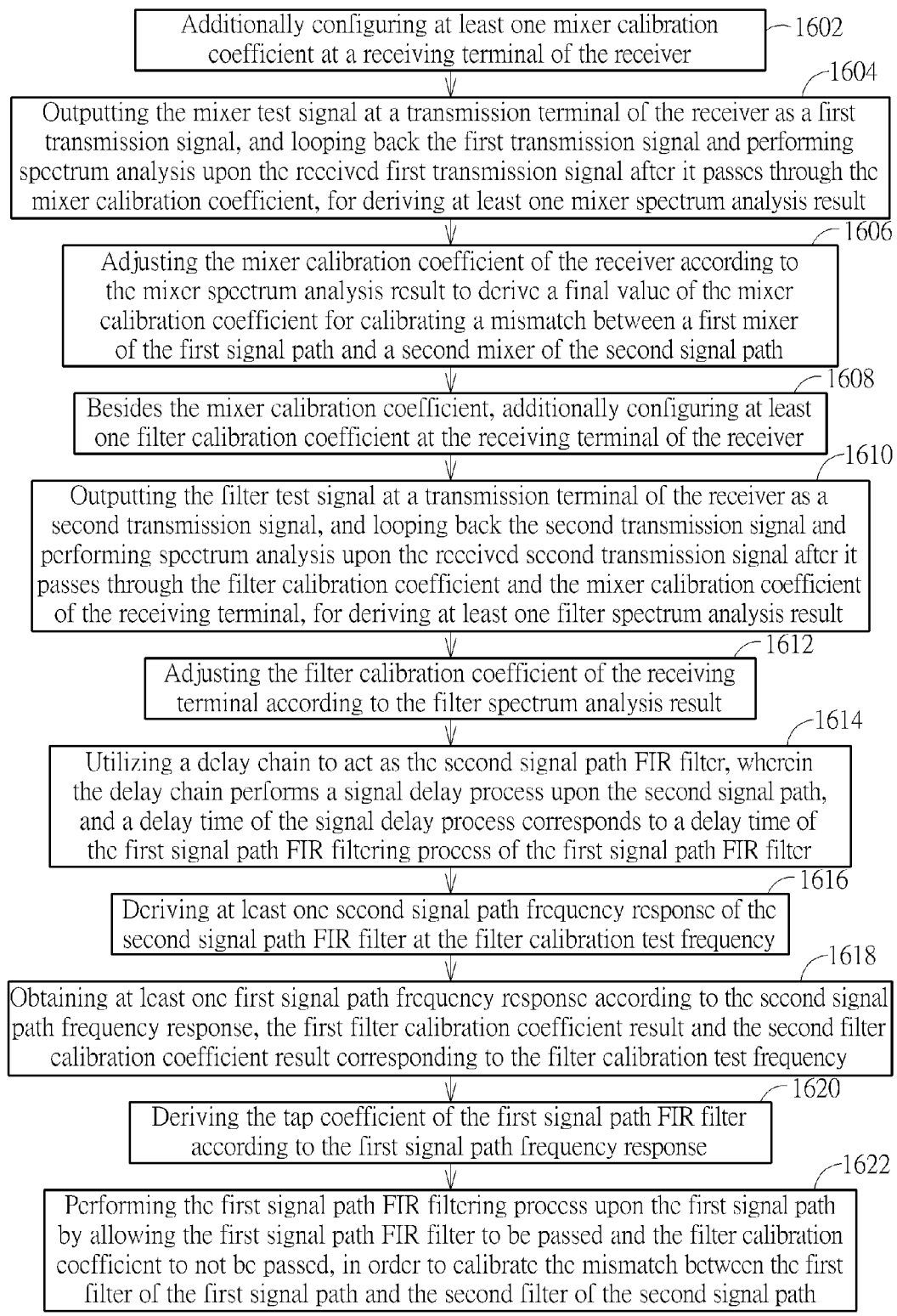
FIG. 16 is a flowchart illustrating a calibration method applied for calibrating mismatches between a first signal path and a second signal path of a receiver according to an embodiment of the present invention.

FIG. 16 is a flowchart illustrating a calibration method applied for calibrating mismatches between a first signal path and a second signal path of a receiver according to an embodiment of the present invention; wherein one of the first signal path and the second signal path is an I-path; and the other is a Q-path. Provided that substantially the same result is achieved, the steps in FIG. 16 need not be in the exact order shown and need not be contiguous; that is, other steps can be intermediate. Some steps in FIG. 16 may be omitted according to various embodiments or requirements. The calibration method shown in FIG. 16 can be applied to the receiver 1400 shown in FIG. 14. Details of the calibration method are described as follows.

Step 1602: additionally configuring at least one mixer calibration coefficient at a receiving terminal of the receiver;

Step 1604: outputting the mixer test signal at a transmission terminal of the receiver as a first transmission signal, and looping back the first transmission signal and performing spectrum analysis upon the received first transmission signal after it passes through the mixer calibration coefficient, for deriving at least one mixer spectrum analysis result;

Step 1606: adjusting the mixer calibration coefficient of the receiver according to the mixer spectrum analysis result to derive a final value of the mixer calibration coefficient for calibrating a mismatch between a first mixer of the first signal path and a second mixer of the second signal path;

Step 1608: besides the mixer calibration coefficient, additionally configuring at least one filter calibration coefficient at the receiving terminal of the receiver;

Step 1610: outputting the filter test signal at a transmission terminal of the receiver as a second transmission signal, and looping back the second transmission signal and performing spectrum analysis upon the received second transmission signal after it passes through the filter calibration coefficient and the mixer calibration coefficient of the receiving terminal, for deriving at least one filter spectrum analysis result;

Step 1612: adjusting the filter calibration coefficient of the receiving terminal according to the filter spectrum analysis result;

Step 1614: utilizing a delay chain to act as the second signal path FIR filter, wherein the delay chain performs a signal delay process upon the second signal path, and a delay time of the signal delay process corresponds to a delay time of the first signal path FIR filtering process of the first signal path FIR filter;

Step 1616: deriving at least one second signal path frequency response of the second signal path FIR filter at the filter calibration test frequency;

Step 1618: obtaining at least one first signal path frequency response according to the second signal path frequency response, the first filter calibration coefficient result and the second filter calibration coefficient result corresponding to the filter calibration test frequency;

Step 1620: deriving the tap coefficient of the first signal path FIR filter according to the first signal path frequency response; and Step 1622: performing the first signal path FIR filtering process upon the first signal path by allowing the first signal path FIR filter to be passed and the filter calibration coefficient to not be passed, in order to calibrate the mismatch between the first filter of the first signal path and the second filter of the second signal path.

Those skilled in the art will readily understand the calibration method shown in FIG. 16 after reading the above paragraphs regarding the transmitter 1400 shown in FIG. 14. Further description is therefore omitted here for brevity.

Figure 17:
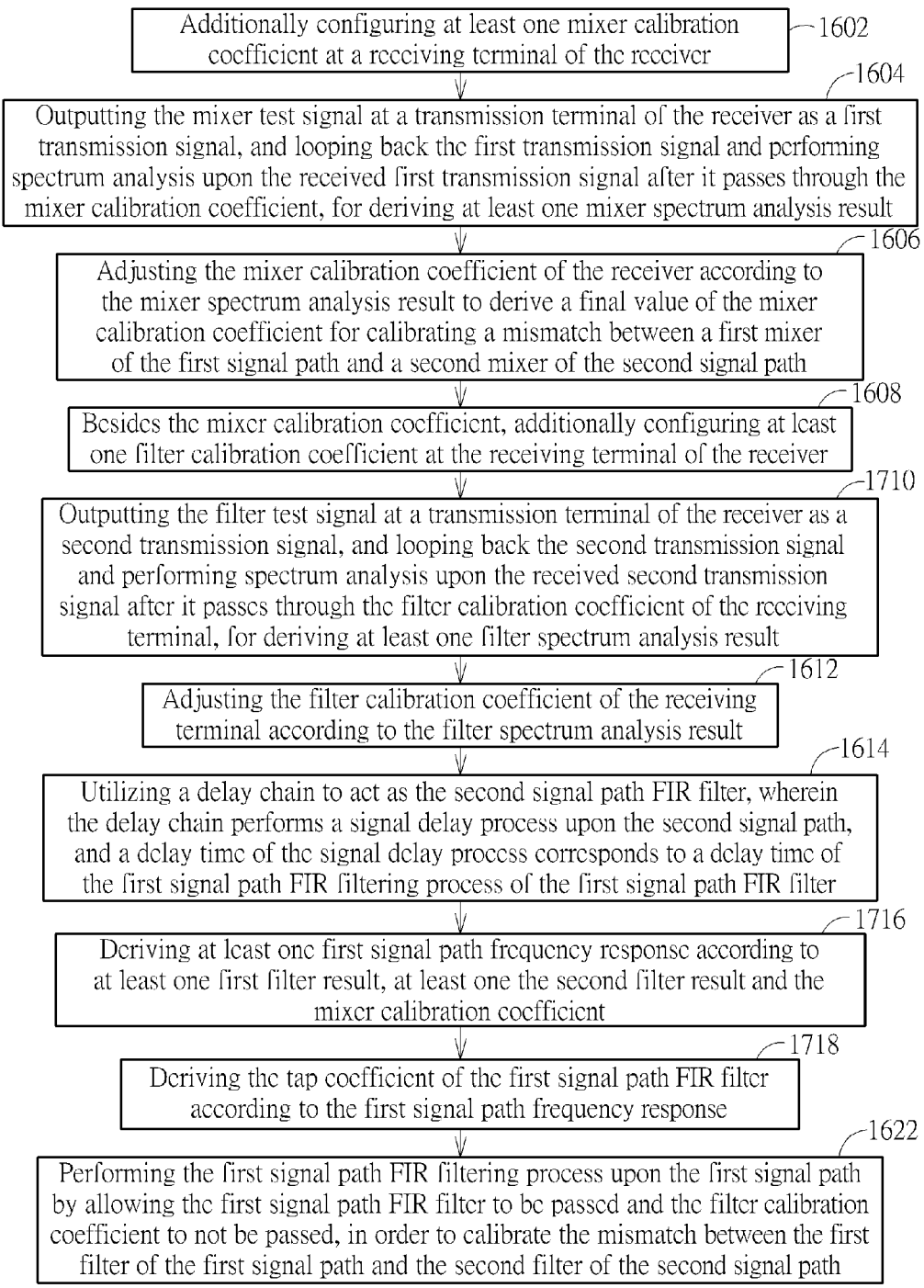
FIG. 17 is a flowchart illustrating a calibration method applied for calibrating mismatches between a first signal path and a second signal path of a receiver according to an embodiment of the present invention.

FIG. 17 is a flowchart illustrating a calibration method applied for calibrating mismatches between a first signal path and a second signal path of a receiver according to an embodiment of the present invention; wherein one of the first signal path and the second signal path is an I-path; and the other is a Q-path. Provided that substantially the same result is achieved, the steps in FIG. 17 need not be in the exact order shown and need not be contiguous; that is, other steps can be intermediate. Some steps in FIG. 17 may be omitted according to various embodiments or requirements. The calibration method shown in FIG. 17 can be applied to the receiver 1500 shown in FIG. 15. Details of the calibration method are described as follows.

Step 1602: additionally configuring at least one mixer calibration coefficient at a receiving terminal of the receiver;

Step 1604: outputting the mixer test signal at a transmission terminal of the receiver as a first transmission signal, and looping back the first transmission signal and performing spectrum analysis upon the received first transmission signal after it passes through the mixer calibration coefficient, for deriving at least one mixer spectrum analysis result;

Step 1606: adjusting the mixer calibration coefficient of the receiver according to the mixer spectrum analysis result to derive a final value of the mixer calibration coefficient for calibrating a mismatch between a first mixer of the first signal path and a second mixer of the second signal path;

Step 1608: besides the mixer calibration coefficient, additionally configuring at least one filter calibration coefficient at the receiving terminal of the receiver;

Step 1710: outputting the filter test signal at a transmission terminal of the receiver as a second transmission signal, and looping back the second transmission signal and performing spectrum analysis upon the received second transmission signal after it passes through the filter calibration coefficient of the receiving terminal, for deriving at least one filter spectrum analysis result;

Step 1612: adjusting the filter calibration coefficient of the receiving terminal according to the filter spectrum analysis result;

Step 1614: utilizing a delay chain to act as the second signal path FIR filter, wherein the delay chain performs a signal delay process upon the second signal path, and a delay time of the signal delay process corresponds to a delay time of the first signal path FIR filtering process of the first signal path FIR filter;

Step 1716: deriving at least one first signal path frequency response according to at least one first filter result, at least one the second filter result and the mixer calibration coefficient;

Step 1718: deriving the tap coefficient of the first signal path FIR filter according to the first signal path frequency response;

Step 1622: performing the first signal path FIR filtering process upon the first signal path by allowing the first signal path FIR filter to be passed and the filter calibration coefficient to not be passed, in order to calibrate the mismatch between the first filter of the first signal path and the second filter of the second signal path.

Those skilled in the art will readily understand the calibration method shown in FIG. 17 after reading the above paragraphs regarding the transmitter 1500 shown in FIG. 15. Further description is therefore omitted here for brevity.

The main purpose of the present invention is to compensate mismatches between an I-path and a Q-path of a transmitter/receiver through the above methods and apparatus, and especially to compensate mismatches between a mixer of the I-path and a mixer of the Q-path of a transmitter/receiver and to compensate mismatches between a low-pass filter of the I-path and a low-pass filter of the Q-path of the transmitter/receiver, which improves the performance of electronic devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for calibrating mismatches between a first signal path and a second signal path of a receiver, wherein one of the first signal path and the second signal path is an in-phase signal path; and the other is a quadrature signal path, and the method comprises:

additionally configuring at least one mixer calibration coefficient at a receiving terminal of the receiver;

outputting the mixer test signal at a transmission terminal of the receiver as a first transmission signal, and looping back the first transmission signal and performing spectrum analysis upon the received first transmission signal after it passes through the mixer calibration coefficient, for deriving at least one mixer spectrum analysis result;

adjusting the mixer calibration coefficient of the receiver according to the mixer spectrum analysis result to derive a final value of the mixer calibration coefficient for calibrating a mismatch between a first mixer of the first signal path and a second mixer of the second signal path; and performing a first signal path finite impulse response (FIR) filtering process upon the first signal path by additionally utilizing a first signal path FIR filter, and performing a second signal path FIR filtering process upon the second signal path by additionally utilizing a second signal path FIR filter, to calibrate a mismatch between a first filter of the first signal path and a second filter of the second signal path.

2. The method of claim 1, wherein the mixer calibration coefficient includes at least one first mixer calibration coefficient and a second mixer calibration coefficient, and the first mixer calibration coefficient is used to calibrate amplitude mismatches between the first signal path and the second signal path; and the second mixer calibration coefficient is used to calibrate phase mismatches between the first signal path and the second signal path.

3. The method of claim 2, wherein the mixer test signal includes a first mixer calibration test signal and a second mixer calibration test signal, and the first mixer calibration test signal has a first mixer calibration test frequency and the second mixer calibration test signal has a second mixer calibration test frequency; and the first mixer calibration test frequency is formed by adding a frequency of a local oscillator of the receiver with a specific frequency, and the second mixer calibration test frequency is formed by subtracting the specific frequency from the frequency of the local oscillator of the receiver.

4. The method of claim 3, wherein the step of adjusting the mixer calibration coefficient according to the mixer spectrum analysis result, to derive the final value of the mixer calibration coefficient comprises:
adjusting the first mixer calibration coefficient, and applying the first mixer calibration coefficient which relatively minimizes an image signal of the first mixer calibration test signal to be a first result;
adjusting the second mixer calibration coefficient, and applying the second mixer calibration coefficient which relatively minimizes the image signal of the first mixer calibration test signal to be a second result;
adjusting the first mixer calibration coefficient, and applying the first mixer calibration coefficient which relatively minimizes an image signal of the second mixer calibration test signal to be a third result;
adjusting the second mixer calibration coefficient, and applying the second mixer calibration coefficient which relatively minimizes the image signal of the second mixer calibration test signal to be a fourth result; and
deriving the final value of the first mixer calibration coefficient according to the first result and the third result, and deriving the final value of the second mixer calibration coefficient according to the second result and the fourth result.

5. The method of claim 1, wherein the step of performing the first signal path FIR filtering process upon the first signal path by additionally utilizing the first signal path FIR filter comprises:
besides the mixer calibration coefficient, additionally configuring at least one filter calibration coefficient at the receiving terminal of the receiver;
outputting the filter test signal at a transmission terminal of the receiver as a second transmission signal, and looping back the second transmission signal and performing spectrum analysis upon the received second transmission signal after it passes through the filter calibration coefficient of the receiving terminal, for deriving at least one filter spectrum analysis result;
adjusting the filter calibration coefficient of the receiving terminal according to the filter spectrum analysis result;
deriving at least one tap coefficient of the first signal path FIR filter of the receiving terminal according to the adjusted filter calibration coefficient; and
performing the first signal path FIR filtering process upon the first signal path by allowing the first signal path FIR filter to be passed and the filter calibration coefficient to not be passed, to calibrate the mismatch between the first filter of the first signal path and the second filter of the second signal path.

6. The method of claim 5, wherein the step of looping back the second transmission signal and performing the spectrum analysis upon the received second transmission signal after it passes through the filter calibration coefficient of the receiving terminal comprises:
looping back the second transmission signal and performing the spectrum analysis upon the received second transmission signal after it passes through the filter calibration coefficient and the mixer calibration coefficient of the receiving terminal.

7. The method of claim 6, wherein the filter calibration coefficient at least includes a first filter calibration coefficient and a second filter calibration coefficient; and the first filter calibration coefficient is used to calibrate amplitude mismatches between the first signal path and the second signal path; and the second filter calibration coefficient is used to calibrate phase mismatches between the first signal path and the second signal path.

8. The method of claim 7, wherein the filter test signal includes at least one filter calibration test frequency, and the filter calibration test frequency is within a target bandwidth of the receiver.

9. The method of claim 8, wherein the step of adjusting the filter calibration coefficient of the receiving terminal according to the filter spectrum analysis result comprises:
adjusting the first filter calibration coefficient, and applying the first filter calibration coefficient which relatively minimizes an image signal of the filter test signal to be at least one first filter calibration coefficient result; and
adjusting the second filter calibration coefficient, and applying the second filter calibration coefficient which relatively minimizes the image signal of the filter test signal to be at least one second filter calibration coefficient result.

10. The method of claim 9, wherein the step of deriving the tap coefficient of the first signal path FIR filter of the receiving terminal according to the adjusted filter calibration coefficient comprises:
deriving at least one second signal path frequency response of the second signal path FIR filter at the filter calibration test frequency;
obtaining at least one first signal path frequency response according to the second signal path frequency response, the first filter calibration coefficient result and the second filter calibration coefficient result corresponding to the filter calibration test frequency; and
deriving the tap coefficient of the first signal path FIR filter according to the first signal path frequency response.

11. The method of claim 5, wherein the step of looping back the second transmission signal and performing the spectrum analysis upon the received second transmission signal after it passes through the filter calibration coefficient of the receiving terminal comprises:
looping back the second transmission signal and performing the spectrum analysis upon the received second transmission signal after it passes through the filter calibration coefficient but does not pass through the mixer calibration coefficient of the receiving terminal.

12. The method of claim 11, wherein the filter calibration coefficient at least includes a first filter calibration coefficient and a second filter calibration coefficient; and the first filter calibration coefficient is used to calibrate amplitude mismatches between the first signal path and the second signal path; and the second filter calibration coefficient is used to calibrate phase mismatches between the first signal path and the second signal path.

13. The method of claim 12, wherein the filter test signal has at least one filter calibration test frequency, and the filter calibration test frequency is within a target bandwidth of the receiver.

14. The method of claim 13, wherein the step of adjusting the filter calibration coefficient of the receiving terminal according to the filter spectrum analysis result comprises:
   adjusting the first filter calibration coefficient, and applying the first filter calibration coefficient which relatively minimizes an image signal of the filter test signal to be at least one first filter result; and
   adjusting the second filter calibration coefficient, and applying the second filter calibration coefficient which relatively minimizes the image signal of the filter test signal to be at least one second filter result.

15. The method of claim 14, wherein the step of deriving the tap coefficient of the first signal path FIR filter of the receiving terminal according to the adjusted filter calibration coefficient comprises:
   deriving at least one first signal path frequency response according to the first filter result, the second filter result and the mixer calibration coefficient; and
   deriving the tap coefficient of the first signal path FIR filter according to the first signal path frequency response.

16. An apparatus for calibrating mismatches between a first signal path and a second signal path of a receiver, wherein one of the first signal path and the second signal path is an in-phase signal path; and the other is a quadrature signal path, and the apparatus comprises:
   a mixer calibration coefficient unit, coupled to a receiving terminal of the receiver, wherein the mixer calibration coefficient unit is configured to have at least one mixer calibration coefficient;
   a mixer test signal generating unit, arranged for outputting the mixer test signal at a transmission terminal of the receiver as a first transmission signal;
   a spectrum analysis unit, arranged for performing spectrum analysis upon the received first transmission signal which passes through the mixer calibration coefficient, to derive at least one mixer spectrum analysis result;
   a mixer calibration coefficient adjustment unit, arranged for adjusting the mixer calibration coefficient according to the mixer spectrum analysis result to derive a final value of the mixer calibration coefficient for calibrating a mismatch between a first mixer of the first signal path and a second mixer of the second signal path; and
   a finite impulse response (FIR) filtering unit, coupled to the receiving terminal of the receiver, arranged for performing a first signal path FIR filtering process upon the first signal path by additionally utilizing a first signal path FIR filter, and performing a second signal path FIR filtering process upon the second signal path by additionally utilizing a second signal path FIR filter to calibrate a mismatch between a first filter of the first signal path and a second filter of the second signal path.

17. The apparatus of claim 16, wherein the mixer calibration coefficient includes at least one first mixer calibration coefficient and a second mixer calibration coefficient, and the first mixer calibration coefficient is used to calibrate amplitude mismatches between the first signal path and the second signal path; and the second mixer calibration coefficient is used to calibrate phase mismatches between the first signal path and the second signal path.

18. The apparatus of claim 17, wherein the mixer test signal includes a first mixer calibration test signal and a second mixer calibration test signal, and the first mixer calibration test signal has a first mixer calibration test frequency and the second mixer calibration test signal has a second mixer calibration test frequency; and the first mixer calibration test frequency is formed by adding a frequency of a local oscillator of the receiver with a specific frequency, and the second mixer calibration test frequency is formed by subtracting the specific frequency from the frequency of the local oscillator of the receiver.

19. The apparatus of claim 18, wherein the mixer calibration coefficient adjustment unit adjusts the first mixer calibration coefficient, and applies the first mixer calibration coefficient which relatively minimizes an image signal of the first mixer calibration test signal to be a first result; adjusts the second mixer calibration coefficient, and applies the second mixer calibration coefficient which relatively minimizes the image signal of the first mixer calibration test signal to be a second result; adjusts the first mixer calibration coefficient, and applies the first mixer calibration coefficient which relatively minimizes an image signal of the second mixer calibration test signal to be a third result; adjusts the second mixer calibration coefficient, and applies the second mixer calibration coefficient which relatively minimizes the image signal of the second mixer calibration test signal to be a fourth result; and derives the final value of the first mixer calibration coefficient according to the first result and the third result, and derives the final value of the second mixer calibration coefficient according to the second result and the fourth result.

20. The apparatus of claim 16, wherein the spectrum analysis unit further performs spectrum analysis upon at least one filter test signal received by the receiving terminal of the receiver, for deriving at least one filter spectrum analysis result, and the calibration apparatus further comprises:
   a filter calibration coefficient unit, comprising at least one filter calibration coefficient;
   a filter test signal generating unit, arranged for transmitting the filter test signal from the transmission terminal to the receiving terminal of the receiver, wherein the filter test signal passes through the filter calibration coefficient of the receiving terminal;
   a filter calibration coefficient adjustment unit, arranged for adjusting the filter calibration coefficient of the receiving terminal according to the filter spectrum analysis result;
   a tap coefficient computing unit, arranged for deriving at least one tap coefficient of the first signal path FIR filter of the receiving terminal according to the adjusted filter calibration coefficient; and
   a switching unit, arranged for performing the first signal path FIR filtering process upon the first signal path by allowing the first signal path FIR filter to be passed and the filter calibration coefficient to not be passed, to calibrate the mismatch between the first filter of the first signal path and the second filter of the second signal path.

21. The apparatus of claim 20, wherein the filter test signal generating unit is further arranged for transmitting the filter test signal from the transmission terminal to the receiving terminal of the receiver, and the filter test signal passes through the filter calibration coefficient and the mixer calibration coefficient of the receiving terminal.

22. The apparatus of claim 21, wherein the filter calibration coefficient at least includes a first filter calibration coefficient and a second filter calibration coefficient; and the first filter calibration coefficient is used to calibrate amplitude mismatches between the first signal path and the second signal path; and the second filter calibration coefficient is used to calibrate phase mismatches between the first signal path and the second signal path.

23. The apparatus of claim 22, wherein the filter test signal has at least one filter calibration test frequency, and the filter calibration test frequency is within a target bandwidth of the receiver.

24. The apparatus of claim 23, wherein the filter calibration coefficient adjustment unit adjusts the first filter calibration coefficient, and applies the first filter calibration coefficient which relatively minimizes an image signal of the at least one filter test signal to be at least one first filter calibration coefficient result; and adjusts the second filter calibration coefficient, and applies the second filter calibration coefficient which relatively minimizes the image signal of the filter test signal to be at least one second filter calibration coefficient result.

25. The apparatus of claim 24, wherein the tap coefficient computing unit comprises:
- a second signal path frequency response computing unit, arranged for deriving at least one second signal path frequency response of the second signal path FIR filter at the filter calibration test frequency;
- a main first signal path frequency response computing unit, arranged for obtaining at least one first signal path frequency response according to the second signal path frequency response, the first filter calibration coefficient result and the second filter calibration coefficient result corresponding to the filter calibration test frequency; and
- a coefficient computing unit, arranged for deriving the tap coefficient of the first signal path FIR filter according to the first signal path frequency response.

26. The apparatus of claim 20, wherein the filter test signal generating unit is further arranged for transmitting the filter test signal from the transmission terminal to the receiving terminal of the receiver, and the filter test signal passes through the filter calibration coefficient and does not pass through the mixer calibration coefficient of the receiving terminal.

27. The apparatus of claim 26, wherein the filter calibration coefficient at least includes a first filter calibration coefficient and a second filter calibration coefficient; and the first filter calibration coefficient is used to calibrate amplitude mismatches between the first signal path and the second signal path; and the second filter calibration coefficient is used to calibrate phase mismatches between the first signal path and the second signal path.

28. The apparatus of claim 27, wherein the filter test signal has at least one filter calibration test frequency, and the filter calibration test frequency is within a target bandwidth of the receiver.

29. The apparatus of claim 28, wherein the filter calibration coefficient adjustment unit adjusts the first filter calibration coefficient, and applies the first filter calibration coefficient which relatively minimizes an image signal of the filter test signal to be at least one first filter result; and adjusts the second filter calibration coefficient, and applies the second filter calibration coefficient which relatively minimizes the image signal of the filter test signal to be at least one second filter result.

30. The apparatus of claim 29, wherein the tap coefficient computing unit further comprises:
- an auxiliary first signal path frequency response computing unit, arranged for deriving at least one first signal path frequency response according to the first filter result, the second filter result and the mixer calibration coefficient; and
- a coefficient computing unit, arranged for deriving the tap coefficient of the first signal path FIR filter according to the first signal path frequency response.

* * * * *